US012795430B2

(12) United States Patent
Huang et al.

(10) Patent No.: US 12,795,430 B2
(45) Date of Patent: Nov. 10, 2026

(54) MULTI-PORT REFERENCE SIGNAL TRANSMISSION FOR A FREQUENCY MODULATED CONTINUOUS WAVE WAVEFORM

(71) Applicant: QUALCOMM Incorporated, San Diego, CA (US)

(72) Inventors: Min Huang, Beijing (CN); Kangqi Liu, San Diego, CA (US); Jing Dai, Beijing (CN); Hao Xu, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 19/126,465

(22) PCT Filed: Jan. 4, 2023

(86) PCT No.: PCT/CN2023/070276
§ 371 (c)(1),
(2) Date: May 1, 2025

(87) PCT Pub. No.: WO2024/145801
PCT Pub. Date: Jul. 11, 2024

(65) Prior Publication Data

US 2026/0181447 A1 Jun. 25, 2026

(51) Int. Cl.
*H04W 24/10* (2009.01)
*H04B 1/00* (2006.01)
(Continued)

(52) U.S. Cl.
CPC .............. *H04W 24/10* (2013.01); *H04B 1/00* (2013.01); *H04B 1/69* (2013.01); *H04L 5/0051* (2013.01); *H04B 2001/6912* (2013.01)

(58) Field of Classification Search
CPC . H04W 24/10; H04B 1/69; H04B 2001/6912; H04L 5/0051
See application file for complete search history.

(56) References Cited

U.S. PATENT DOCUMENTS

2018/0287505 A1 10/2018 Logan et al.
2022/0116886 A1* 4/2022 Manolakos ............. G01S 7/003
2024/0381181 A1* 11/2024 Jiang ..................... H04W 24/02

FOREIGN PATENT DOCUMENTS

CN 108111273 A 6/2018
CN 108631984 A 10/2018
(Continued)

OTHER PUBLICATIONS

International Search Report and Written Opinion—PCT/CN2023/070276—ISA/EPO—Aug. 23, 2023.

*Primary Examiner* — Vineeta S Panwalkar
(74) *Attorney, Agent, or Firm* — HOLLAND & HART LLP

(57) ABSTRACT

Methods, systems, and devices for wireless communications are described. A network entity may transmit an indication of one or more FMCW waveform parameters to a user equipment (UE) for transmitting or receiving one or more FMCW reference signals. The network entity may transmit a control message indication one or more time-frequency resources and multiple ports for the FMCW reference signal. The UE may transmit or receive the FMCW reference signal via the multiple ports in accordance with the FMCW waveform parameters and using the time-frequency resources. For example, the UE may transmit one or more sounding reference signals (SRSs) or receive one or more channel state information-reference signals (CSI-RSs).

20 Claims, 20 Drawing Sheets

(51) Int. Cl.
*H04B 1/69* (2011.01)
*H04L 5/00* (2006.01)

(56) References Cited

FOREIGN PATENT DOCUMENTS

| | | | |
|---|---|---|---|
| WO | 2022001563 | | 1/2022 |
| WO | 2022008062 | A1 | 1/2022 |

* cited by examiner

MULTI-PORT REFERENCE SIGNAL TRANSMISSION FOR A FREQUENCY MODULATED CONTINUOUS WAVE WAVEFORM

CROSS REFERENCE

The present Application is a 371 national phase filing of International PCT Application No. PCT/CN2023/070276 by Huang et al., entitled "MULTI-PORT REFERENCE SIGNAL TRANSMISSION FOR A FREQUENCY MODULATED CONTINUOUS WAVE WAVEFORM," filed Jan. 4, 2023, which is assigned to the assignee hereof, and which is expressly incorporated by reference in its entirety herein.

FIELD OF TECHNOLOGY

The following relates to wireless communications, including multi-port reference signal transmission for a frequency modulated continuous wave (FMCW) waveform.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support multi-port reference signal transmission for a frequency modulated continuous wave (FMCW) waveform. For example, the described techniques enable a network entity to transmit signaling configuring a user equipment (UE) with FMCW waveform parameters for transmitting or receiving an FMCW reference signal via multiple ports. The UE may receive a control message indicating time-frequency resources for transmitting or receiving the FMCW reference signal and indicating the multiple ports for the FMCW reference signal. In some examples, the UE may transmit one or more sounding reference signals (SRSs) using the ports and time-frequency resources in accordance with the FMCW waveform parameters. In some other examples, the UE may monitor for and receive one or more channel state information-reference signals (CSI-RSs) using the ports and time-frequency resources in accordance with the FMCW waveform parameters.

A method for wireless communications at a UE is described. The method may include receiving an indication of one or more FMCW waveform parameters for an FMCW reference signal, receiving a control message indicating one or more time-frequency resources for the FMCW reference signal and indicating a set of multiple ports for the FMCW reference signal, and communicating, using the one or more time-frequency resources, the FMCW reference signal via the set of multiple ports in accordance with the one or more FMCW waveform parameters.

An apparatus for wireless communications at a UE is described. The apparatus may include a processor, memory coupled with the processor, and instructions stored in the memory. The instructions may be executable by the processor to cause the apparatus to receive an indication of one or more FMCW waveform parameters for an FMCW reference signal, receive a control message indicating one or more time-frequency resources for the FMCW reference signal and indicating a set of multiple ports for the FMCW reference signal, and communicating, used the one or more time-frequency resources, the FMCW reference signal via the set of multiple ports in accordance with the one or more FMCW waveform parameters.

Another apparatus for wireless communications at a UE is described. The apparatus may include means for receiving an indication of one or more FMCW waveform parameters for an FMCW reference signal, means for receiving a control message indicating one or more time-frequency resources for the FMCW reference signal and indicating a set of multiple ports for the FMCW reference signal, and means for communicating, using the one or more time-frequency resources, the FMCW reference signal via the set of multiple ports in accordance with the one or more FMCW waveform parameters.

A non-transitory computer-readable medium storing code for wireless communications at a UE is described. The code may include instructions executable by a processor to receive an indication of one or more FMCW waveform parameters for an FMCW reference signal, receive a control message indicating one or more time-frequency resources for the FMCW reference signal and indicating a set of multiple ports for the FMCW reference signal, and communicating, used the one or more time-frequency resources, the FMCW reference signal via the set of multiple ports in accordance with the one or more FMCW waveform parameters.

In some examples of the method, apparatuses, and non-transitory computer-readable medium described herein, communicating the FMCW reference signal may include operations, features, means, or instructions for receiving a CSI-RS via the set of multiple ports using the one or more time-frequency resources, where the FMCW reference signal includes the CSI-RS.

Some examples of the method, apparatuses, and non-transitory computer-readable medium described herein may further include operations, features, means, or instructions for performing a frequency shifting operation and applying a low pass filter to the CSI-RS to separate each port of the set of multiple ports, measuring the CSI-RS of respective ports of the set of multiple ports to obtain one or more measurements associated with the CSI-RS, and transmitting a report including the one or more measurements associated with the CSI-RS.

In some examples of the method, apparatuses, and non-transitory computer-readable medium described herein, communicating the FMCW reference signal may include operations, features, means, or instructions for communicating a first chirp of the FMCW reference signal using a first port of the set of multiple ports based on the one or more FMCW waveform parameters and communicating a second chirp of the FMCW reference signal using a second port of the set of multiple ports based on the one or more FMCW waveform parameters, where the second chirp may be non-overlapping in time with the first chirp.

In some examples of the method, apparatuses, and non-transitory computer-readable medium described herein, communicating the FMCW reference signal may include operations, features, means, or instructions for communicating a first chirp of the FMCW reference signal using a first port of the set of multiple ports based on the one or more FMCW waveform parameters and communicating a second chirp of the FMCW reference signal using a second port of the set of multiple ports based on the one or more FMCW waveform parameters, where the second chirp at least partially overlaps in time with the first chirp.

In some examples of the method, apparatuses, and non-transitory computer-readable medium described herein, communicating the FMCW reference signal may include operations, features, means, or instructions for transmitting an SRS, where the FMCW reference signal includes the SRS.

In some examples of the method, apparatuses, and non-transitory computer-readable medium described herein, the one or more FMCW waveform parameters include a chirp duration for the FMCW reference signal based on a number of ports of the set of multiple ports, a time-domain offset for respective ports of the set of multiple ports, a chirp bandwidth for the FMCW reference signal, or any combination thereof.

In some examples of the method, apparatuses, and non-transitory computer-readable medium described herein, the time-domain offset may be different for the respective ports of the set of multiple ports.

A method for wireless communications at a network entity is described. The method may include transmitting an indication of one or more FMCW waveform parameters for an FMCW reference signal, transmitting a control message indicating one or more time-frequency resources for the FMCW reference signal and indicating a set of multiple ports for the FMCW reference signal, and communicating, using the one or more time-frequency resources, the FMCW reference signal via the set of multiple ports in accordance with the one or more FMCW waveform parameters.

An apparatus for wireless communications at a network entity is described. The apparatus may include a processor, memory coupled with the processor, and instructions stored in the memory. The instructions may be executable by the processor to cause the apparatus to transmit an indication of one or more FMCW waveform parameters for an FMCW reference signal, transmit a control message indicating one or more time-frequency resources for the FMCW reference signal and indicating a set of multiple ports for the FMCW reference signal, and communicating, used the one or more time-frequency resources, the FMCW reference signal via the set of multiple ports in accordance with the one or more FMCW waveform parameters.

Another apparatus for wireless communications at a network entity is described. The apparatus may include means for transmitting an indication of one or more FMCW waveform parameters for an FMCW reference signal, means for transmitting a control message indicating one or more time-frequency resources for the FMCW reference signal and indicating a set of multiple ports for the FMCW reference signal, and means for communicating, using the one or more time-frequency resources, the FMCW reference signal via the set of multiple ports in accordance with the one or more FMCW waveform parameters.

A non-transitory computer-readable medium storing code for wireless communications at a network entity is described. The code may include instructions executable by a processor to transmit an indication of one or more FMCW waveform parameters for an FMCW reference signal, transmit a control message indicating one or more time-frequency resources for the FMCW reference signal and indicating a set of multiple ports for the FMCW reference signal, and communicating, used the one or more time-frequency resources, the FMCW reference signal via the set of multiple ports in accordance with the one or more FMCW waveform parameters.

In some examples of the method, apparatuses, and non-transitory computer-readable medium described herein, communicating the FMCW reference signal may include operations, features, means, or instructions for transmitting a CSI-RS via the set of multiple ports using the one or more time-frequency resources, where the FMCW reference signal includes the CSI-RS.

Some examples of the method, apparatuses, and non-transitory computer-readable medium described herein may further include operations, features, means, or instructions for receiving a report including one or more measurements associated with the CSI-RS, the one or more measurements corresponding to respective ports of the set of multiple ports.

In some examples of the method, apparatuses, and non-transitory computer-readable medium described herein, communicating the FMCW reference signal may include operations, features, means, or instructions for communicating a first chirp of the FMCW reference signal using a first port of the set of multiple ports based on the one or more FMCW waveform parameters and communicating a second chirp of the FMCW reference signal using a second port of the set of multiple ports based on the one or more FMCW waveform parameters, where the second chirp may be non-overlapping in time with the first chirp.

In some examples of the method, apparatuses, and non-transitory computer-readable medium described herein, communicating the FMCW reference signal may include operations, features, means, or instructions for communicating a first chirp of the FMCW reference signal using a first port of the set of multiple ports based on the one or more FMCW waveform parameters and communicating a second chirp of the FMCW reference signal using a second port of the set of multiple ports based on the one or more FMCW waveform parameters, where the second chirp at least partially overlaps in time with the first chirp.

In some examples of the method, apparatuses, and non-transitory computer-readable medium described herein, communicating the FMCW reference signal may include operations, features, means, or instructions for receiving an SRS, where the FMCW reference signal includes the SRS.

In some examples of the method, apparatuses, and non-transitory computer-readable medium described herein, the one or more FMCW waveform parameters include a chirp duration for the FMCW reference signal based on a number of ports of the set of multiple ports, a time-domain offset for respective ports of the set of multiple ports, a chirp bandwidth for the FMCW reference signal, or any combination thereof.

In some examples of the method, apparatuses, and non-transitory computer-readable medium described herein, the time-domain offset may be different for the respective ports of the set of multiple ports.

DETAILED DESCRIPTION

In some systems, one or more wireless devices may communicate signaling using a frequency modulated continuous wave (FMCW) waveform in which a frequency of the signaling is varied continuously at a given rate (e.g., defined or varied rate) over a period of time (e.g., fixed or varying duration of time). For example, a transmitting wireless device may generate and transmit an FMCW waveform signal to a receiving wireless device. The receiving wireless device may generate local FMCW waveform signaling using a set of FMCW waveform parameters from the received FMCW waveform signaling. The receiving wireless device may combine the received and local FMCW waveform signaling and may filter the combined signaling. The receiving wireless device may estimate a frequency domain orthogonal frequency division multiplexing (OFDM) channel by sampling the combined FMCW signal using a relatively low sampling rate, which may be based on a bandwidth (BW), BW part (BWP), or subband frequency of the OFDM channel. However, the FMCW waveform signaling from the transmitting wireless device may occupy an entire frequency resource allocation for the signaling. Thus, the transmitting wireless device may be unable to multiplex signaling from multiple reference signal ports in the frequency domain, which may cause inefficiencies due to allocation of resources to respective reference signal ports.

In some cases, to improve resource allocation for multi-port reference signal transmission and reception, a network entity may indicate FMCW waveform parameters for communicating an FMCW reference signal via the multiple ports. For example, the network entity may send an indication of a chirp duration for communicating the FMCW reference signal (e.g., where the chirp duration may be inversely proportional to a quantity of ports), a time-domain offset for respective ports to communicate the FMCW reference signal, a chirp BW for communicating the FMCW reference signal, or any combination thereof. The network entity may also send a control message (e.g., scheduling message) indicating one or more time-frequency resources for the FMCW reference signal and the ports for the FMCW reference signal. The network entity may transmit a channel state information-reference signal (CSI-RS) to the UE using the time-frequency resources and the FMCW waveform parameters. Additionally, or alternatively, the UE may transmit one or more sounding reference signals (SRSs) using the time-frequency resources and the FMCW waveform parameters.

Aspects of the disclosure are initially described in the context of wireless communications systems. Additional aspects are described in the with reference to OFDM channel estimation schemes, resource diagrams, and process flows. Aspects of the disclosure are further illustrated by and described with reference to apparatus diagrams, system diagrams, and flowcharts that relate to multi-port reference signal transmission for a FMCW waveform.

Figure 1:
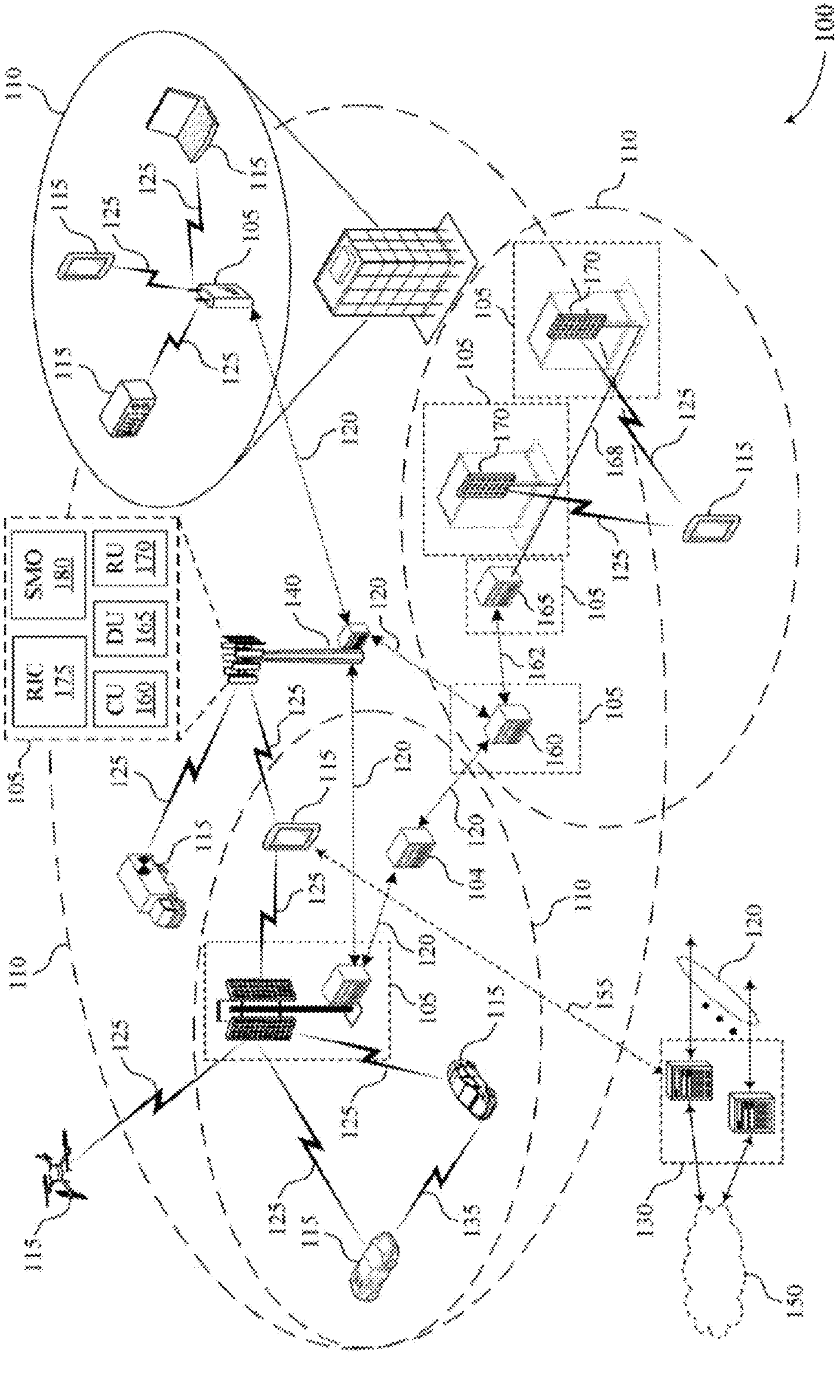
FIG. 1 illustrates an example of a wireless communications system that supports multi-port reference signal transmission for a frequency modulated continuous wave (FMCW) waveform in accordance with one or more aspects of the present disclosure.

FIG. 1 illustrates an example of a wireless communications system 100 that supports multi-port reference signal transmission for a FMCW waveform in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a LUE 115 (e.g., any LUE described herein), a network controller, an apparatus, a device, a computing system, one or more components, or another suitable processing entity configured to perform any of the techniques described herein. For example, a node may be a LUE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support multi-port reference signal transmission for a FMCW waveform as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BW part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular BW of the RF spectrum and, in some examples, the carrier BW may be referred to as a "system BW" of the carrier or the wireless communications system 100. For example, the carrier BW may be one of a set of BWs for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier BW or may be configurable to support communications using one of a set of carrier BWs. In some examples, the wireless communications system 100 may include network entities 105 or UEs 115 that support concurrent communications using carriers associated with multiple carrier BWs. In some examples, each served UE 115 may be configured for operating using portions (e.g., a sub-band, a BWP) or all of a carrier BW.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix (CP). A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_S=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the CP prepended to each symbol period). In some wireless communications systems 100, a slot may further be divided into multiple mini-slots associated with one or more symbols. Excluding the CP, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system BW or a subset of the system BW of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited BW (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system BW or one or more sub-bands. The network entity 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some cases, to improve resource allocation for multi-port reference signal transmission and reception, a network entity 105 may indicate FMCW waveform parameters for communicating an FMCW reference signal via the multiple ports. For example, the network entity 105 may send an indication of a chirp duration for communicating the FMCW reference signal (e.g., where the chirp duration may be inversely proportional to a quantity of ports), a time-domain offset for respective ports to communicate the FMCW reference signal, a chirp BW for communicating the FMCW reference signal, or any combination thereof. The network entity 105 may also send a control message (e.g., scheduling message) indicating one or more time-frequency resources for the FMCW reference signal and the ports for the FMCW reference signal. The network entity 105 may transmit a CSI-RS to a UE 115 using the time-frequency resources and the FMCW waveform parameters. Additionally, or alternatively, the UE 115 may transmit one or more SRSs using the time-frequency resources and the FMCW waveform parameters.

Figure 2:
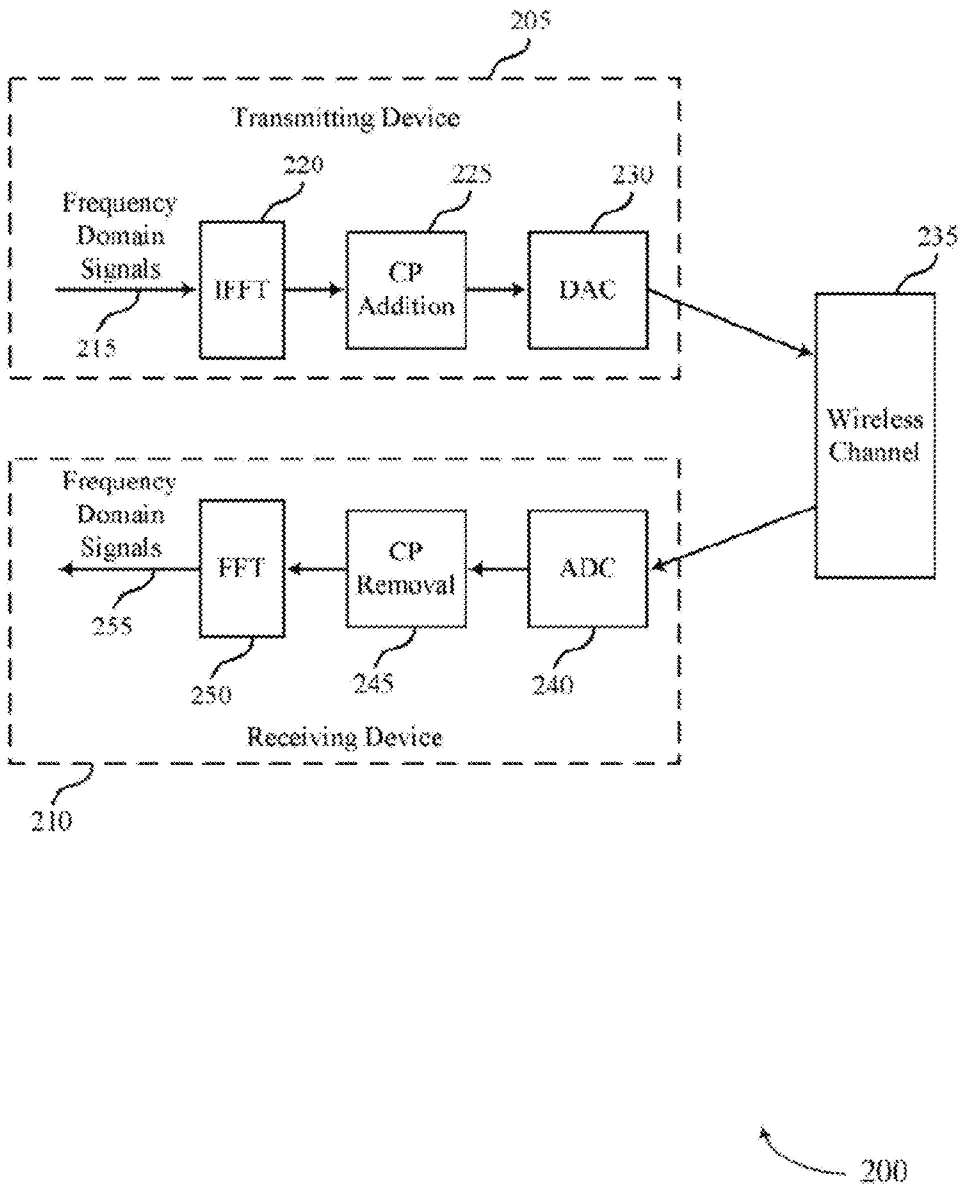
FIGS. 2 and 3 illustrate examples of orthogonal frequency division multiplexing (OFDM) channel estimation schemes that support multi-port reference signal transmission for a FMCW waveform in accordance with one or more aspects of the present disclosure.

FIG. 2 illustrates an example of an OFDM channel estimation scheme 200 that supports multi-port reference signal transmission for a FMCW waveform in accordance with one or more aspects of the present disclosure. In some examples, the OFDM channel estimation scheme 200 may implement aspects of the wireless communications system 100 described with reference to FIG. 1. In this example, a transmitting device 205 (e.g., a UE, a base station, an RU, a DU, a CU, an IAB node or some other device) and a receiving device 210 (e.g., a UE, a base station, an RU, a DU, a CU, an IAB node or some other device) may exchange OFDM signals via a wireless channel 235, which may be an OFDM channel. The receiving device 210 may estimate the wireless channel 235 using frequency domain signal processing.

The transmitting device 205 and the receiving device 210 may establish a connection for wireless communications via the wireless channel 235. The transmitting device 205 may generate an OFDM signal for transmission to the receiving device 210 via the wireless channel 235. To generate the OFDM signal, the transmitting device 205 may identify data scheduled for transmission to the receiving device 210. The data may include or be converted to a set of frequency domain signals 215 (e.g., $\{X(0), X(1), \ldots X(N_c-1)\}$). The transmitting device 205 may perform an inverse fast Fourier transform (IFFT) 220 on the frequency domain signals 215 to convert the frequency domain signals 215 to a time domain signal (e.g., X(m)).

The transmitting device 205 may perform CP addition 225 to the time domain signal. For example, the transmitting device 205 may add a CP to the time domain signal to generate an OFDM signal. The transmitting device 205 may subsequently use a digital-to-analog converter (DAC) 230 to convert the time domain signal from a digital signal to an analog signal. In some examples, the transmitting device 205 may convert a real and imaginary portion of the digital time domain signal to the analog domain separately. The transmitting device 205 may transmit the analog time domain OFDM signal to the receiving device 210 via the wireless channel 235.

The receiving device 210 may receive the analog time domain OFDM signal and use an ADC 240 at the receiving device 210 to convert the received signal to a digital domain. In some examples, the receiving device 210 may convert a real portion and an imaginary portion of the analog signal to the digital domain separately. The receiving device 210 may perform CP removal 245 to remove the CPs from the time domain digital signal after using the ADC 240. After removing the CPs, the receiving device 210 may perform FFT 250 on the digital time domain signal. The FFT 250 may convert the time domain signal to a frequency domain. That is, the FFT 250 may produce a set of frequency domain signals 255.

The receiving device 210 may use the set of frequency domain signals 255 produced by the FFT 250 to estimate a frequency domain OFDM channel (e.g., a frequency domain of the wireless channel 235). In some examples, to estimate a frequency domain OFDM channel based on OFDM signals, as described with reference to FIG. 2, the ADC 240 at the receiving device 210 may be a relatively high-rate ADC 240. That is, a sampling rate of the ADC 240 may be relatively high to accurately convert the analog OFDM signals to digital OFDM signals.

Example sampling rates of the ADC 240 that may be used for different configured subcarrier spacing (SCS) values are shown in Table 1.

TABLE 1

FFT Size, Subcarriers (sc), and Sampling Rate Per SCS

| SCS | 20 MHz | 50 MHz | 100 MHz | 200 MHz | 400 MHz |
|---|---|---|---|---|---|
| 15 kHz | 2048 FFT<br>1320 sc<br>(110 PRBs)<br>30.72 Msps | 4096 FFT<br>3300 sc<br>(275 PRBs)<br>61.44 Msps | N/A >275 PRBs | N/A >275 PRBs | N/A >275 PRBs |

TABLE 1-continued

| FFT Size, Subcarriers (sc), and Sampling Rate Per SCS | | | | | |
|---|---|---|---|---|---|
| SCS | 20 MHz | 50 MHz | 100 MHz | 200 MHz | 400 MHz |
| 30 kHz | 1024 FFT<br>660 sc<br>(55 PRBs)<br>30.72 Msps | 2048 FFT<br>1644 sc<br>(137 PRBs)<br>61.44 Msps | 4096 FFT<br>3300 sc<br>(275 PRBs)<br>122.88 Msps | N/A >275<br>PRBs | N/A >275<br>PRBs |
| 60 kHz | 512 FFT<br>324 sc<br>(27 PRBs)<br>30.72 Msps | 1024 FFT<br>816 sc<br>(68 PRBs)<br>61.44 Msps | 2048 FFT<br>1644 sc<br>(137 PRBs)<br>122.88 Msps | 4096 FFT<br>3300 sc<br>(275 PRBs)<br>245.76 Msps | N/A >275<br>PRBs |
| 120 kHz | N/A <20<br>PRBs | 512 FFT<br>408 sc<br>(34 PRBs)<br>61.44 Msps | 1024 FFT<br>816 sc<br>(68 PRBs)<br>122.88 Msps | 2048 FFT<br>1644 sc<br>(137 PRBs)<br>245.76 Msps | 4096 FFT<br>3300 sc<br>(275 PRBs)<br>491.52 Msps |

The sampling rate may be defined in unites of mega-samples per second (Msps). The sampling rate may be calculated based on the SCS value and a respective FFT size and may be associated with a respective quantity of subcarriers (sc) (e.g., in quantities of physical resource blocks (PRBs)). For example, the sampling rate may be equal to a product of the SCS and the $N_{FFT}$ size (e.g., 15 KHz*2048=30.72 MHz).

In some examples, performing the FFT 250 by the receiving device 210 may be associated with relatively high processing and complexity. Additionally, or alternatively, the ADC 240 at the receiving device 210 may be a relatively high rate ADC 240. A sampling rate used to convert the received analog signal to digital form, such as the sampling rates shown in Table 1, may be relatively high for the receiving device 210 to accurately convert OFDM signals and subsequently perform FFT 250.

Techniques, systems, and devices described herein enable a transmitting device 205 and a receiving device 210 to exchange FMCW signals via the wireless channel 235. The FMCW signals may be configured for channel estimation of an OFDM channel, and may support reduced processing complexity at the receiver. For example, the FMCW signals may be sampled at a reduced sampling rate as compared to OFDM signals, and may be used to estimate the frequency domain OFDM channel using time domain signal processing, such that the receiving device 210 may refrain from performing the FFT 250, which may reduce complexity as compared with using OFDM signals to estimate OFDM channels.

However, the FMCW waveform signals from the transmitting device 205 may occupy an entire frequency resource allocation for the signaling. Thus, the transmitting device 205 may be unable to multiplex signaling from multiple reference signal ports in the frequency domain, which may cause inefficiencies due to resource allocation to respective reference signal ports. In some cases, to improve resource allocation for multi-port reference signal transmission and reception, a transmitting device 205 may indicate FMCW waveform parameters to a receiving device 210 for communicating an FMCW reference signal via the multiple ports. For example, the transmitting device 205 may send an indication of a chirp duration for communicating the FMCW reference signal (e.g., where the chirp duration may be inversely proportional to a quantity of ports), a time-domain offset for respective ports to communicate the FMCW reference signal, a chirp BW for communicating the FMCW reference signal, or any combination thereof. The transmitting device 205 may also send a control message (e.g., scheduling message) indicating one or more time-frequency resources for the FMCW reference signal and the ports for the FMCW reference signal. The transmitting device 205 may transmit a CSI-RS to the receiving device 210 using the time-frequency resources and the FMCW waveform parameters. Additionally, or alternatively, the receiving device 210 may transmit one or more SRSs using the time-frequency resources and the FMCW waveform parameters.

Figure 3:
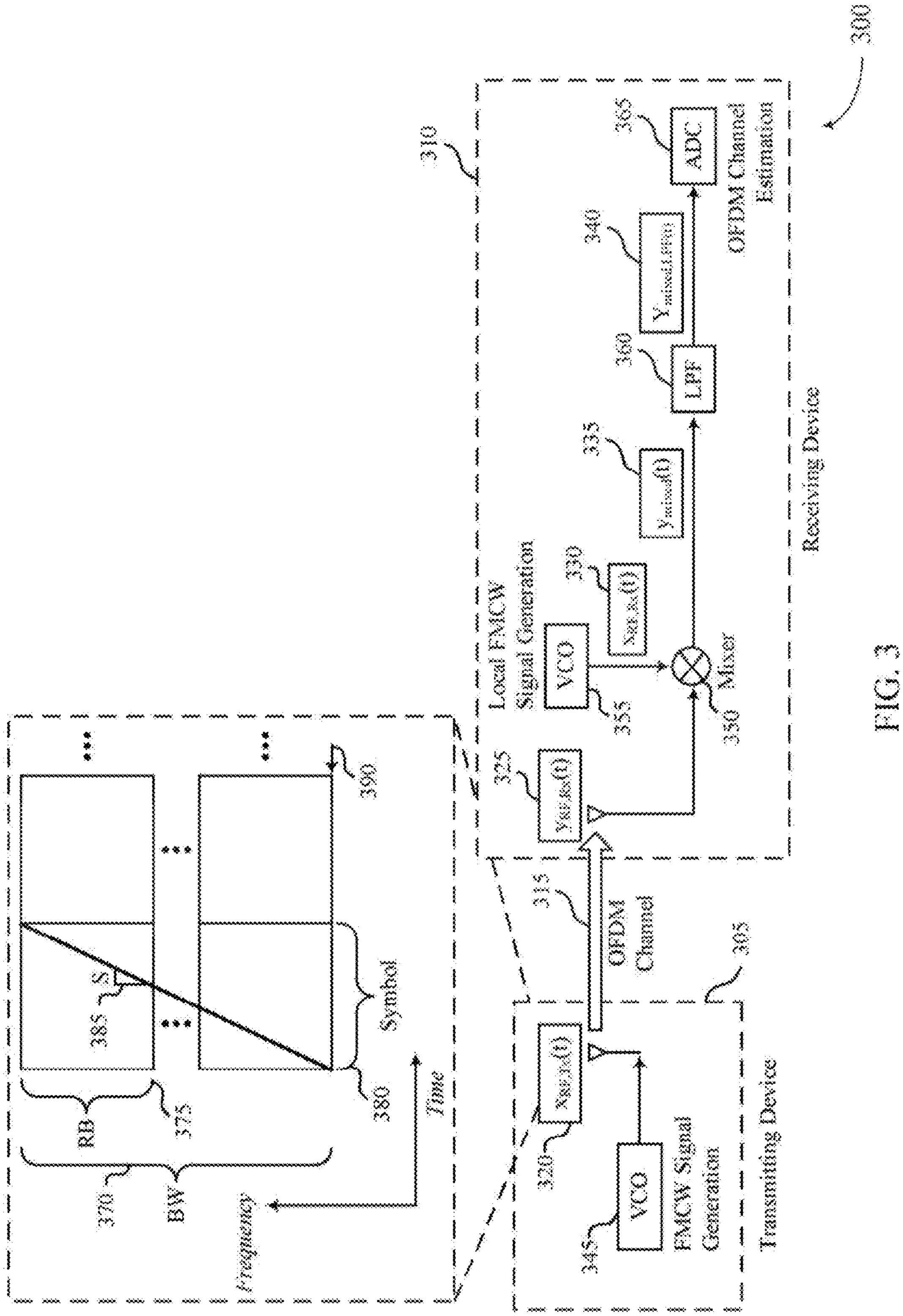

FIG. 3 illustrates an example of an OFDM channel estimation scheme 300 that supports multi-port reference signal transmission for a FMCW waveform in accordance with one or more aspects of the present disclosure. In some examples, the OFDM channel estimation scheme 300 may implement aspects of the wireless communications system 100 described with reference to FIG. 1. In this example, a first device 305 (e.g., a UE, a base station, an RU, a DU, a CU, an IAB node or some other device) and a second device 310 (e.g., a UE, a base station, an RU, a DU, a CU, an IAB node or some other device) may exchange an FMCW signal via an OFDM channel 315. The FMCW signal may be used to facilitate channel estimation of the frequency domain OFDM channel by the second device 310.

The first device 305 and the second device 310 may establish a connection for wireless communications via an OFDM channel 315. The devices may be UEs 115, network entities 105, other devices, or any combination thereof. In some examples, the devices may exchange one or more capability messages, control messages, or both to initiate an FMCW-based OFDM channel estimation procedure described herein. After the FMCW-based OFDM channel estimation procedure is initiated, the first device 305 may generate an FMCW signal 320 (e.g., a first FMCW signal). In some examples, the first device 305 may generate the FMCW signal 320 in an analog domain using a voltage controlled oscillator (VCO) 345. The first device 305 may transmit the FMCW signal 320 via the OFDM channel 315 using at least one antenna element at the first device 305. The analog domain FMCW signal 320 generated and transmitted by the first device 305 may be represented by $x_{RF,Tx}(t)$, shown in Equation 1.

$$x_{RF,Tx}(t) = \cos\left(2\pi\left(f_c + \frac{S}{2}t\right)t + \phi_{Tx}\right) \tag{1}$$

As shown in Equation 1, the FMCW signal 320 may be a time-domain signal (e.g., a function of time (t)). In the example of Equation 1, $f_c$ may represent a starting frequency 390 of the FMCW signal 320, S may represent a slope 385 of the FMCW signal 320, and $\phi_{Tx}$ may represent a phase of the first device 305.

As illustrated in FIG. 3, the FMCW signal 320 may be associated with a waveform signal transmitted via a symbol 380 of the OFDM channel 315 in the time domain and a BW 370 of the OFDM channel 315 in the frequency domain. The BW 370 may include one or more resource blocks 375 in the frequency domain. In some examples, each resource block 375 may include a set of resource elements in the frequency domain. The OFDM channel 315 may include multiple symbols 380 in the time domain. A duration or length of each symbol 380 may correspond to a length of an OFDM symbol, or a length of an OFDM symbol and a respective CP duration, or a partial length of an OFDM symbol, or a partial length of an OFDM symbol and a respective CP duration, or some other length longer than the length of the OFDM symbol and the length of the OFDM symbol and CP duration, or some other symbol duration, or any combination thereof. The FMCW signal 320 may span frequencies between the starting frequency 390 and a sum of the starting frequency 390 and the BW 370 (e.g., $\{f_c, f_c+BW\}$). The slope 385 of the FMCW signal 320 may correspond to a quotient of the BW 370 and a duration of the symbol 380 via which the FMCW signal 320 is transmitted, as shown by Equation 2.

$$S = \frac{BW}{T_{sym}} = \frac{N_{RE} \cdot \Delta f}{T_{sym}} \tag{2}$$

In the example of Equation 2, $T_{sym}$ may represent the duration of the symbol 380, $N_{RE}$ may represent a quantity of resource elements in the BW 370, and $\Delta f$ may represent an SCS. In this example, the slope may be calculated based on a symbol duration that corresponds to a length of an OFDM symbol. For example, the duration of the symbol 380 may be an inverse of an SCS $$\left(\text{e.g., } T_{sym} = \frac{1}{\Delta f}\right).$$

The radio frequency FMCW signal 325 that is received by the second device 310 via the OFDM channel 315 in response to the FMCW signal 320 transmitted by the first device 305 may be represented by $y_{RF,Rx}(t)$, shown in Equation 3.

$$y_{RF,Rx}(t) = \sum_{p=0}^{P-1} A_p x_{RF,Tx}(t-\tau_p) + n(t) = \sum_{p=0}^{P-1} A_p \cos\left(2\pi\left(f_c + \frac{S}{2}(t-\tau_p)\right)(t-\tau_p) + \phi_{Tx}\right) + n(t) \tag{3}$$

In the example of Equation 3, P may represent a quantity of channel delay paths (e.g., a quantity of multi-paths) associated with the OFDM channel 315, and $\tau_p$ may represent a given channel delay with index p. That is, the received FMCW signal 325 may be sampled over various channel delays (e.g., p=0 to P−1). $A_P$ may represent gain of a channel delay path p and n(t) may represent channel noise. In some examples, the channel noise may be associated with a relatively small value relative to the other values that define the radio frequency FMCW signal 325 that is received by the second device 310 in Equation 3.

As described herein, the second device 310 may generate an FMCW signal 330 at the receiving device. The FMCW signal 330 generated at the second device 310 may be referred to as a second FMCW signal or a local FMCW signal. The second device 310 may generate the FMCW signal 330 in the analog domain using a VCO 355 at the second device 310. The second device 310 may generate the FMCW signal 330 at the same time as or after receiving the FMCW signal 325. The FMCW signal 330 generated by the second device 310 may be represented by $x_{RF,Rx}(t)$, shown in Equation 4.

$$x_{RF,Rx}(t) = \exp\left(-j\left(2\pi\left(f_c + \frac{S}{2}t\right)t - \phi_{Rx}\right)\right) \tag{4}$$

As shown in Equation 4, the second device 310 may generate the FMCW signal 330 based on a set of FMCW parameters associated with the FMCW signal 320 transmitted by the first device 305. The set of FMCW parameters may include, for example, the starting frequency 390 ($f_c$) of the FMCW signal 320, the slope 385 (S) of the FMCW signal 320, or any combination thereof. That is, the FMCW signal 330 generated by the second device 310 may have a same starting frequency 390 and slope 385 as the FMCW signal 320 generated by the first device 305. In the example of Equation 4, $\phi_{RX}$ may represent a phase of the second device 310. In some examples, the first device 305 may transmit a control message that indicates the set of FMCW parameters for generation, by the second device 310, of the FMCW signal 330. Additionally, or alternatively, the second device 310 may transmit a control message that indicates the set of FMCW parameters for generation, by the first device 305, of the FMCW signal 320 and for generation, by the second device 310, of the FMCW signal 330, as described in further detail elsewhere herein, including with reference to FIGS. 4 through 6.

The FMCW signal 320 transmitted by the first device 305 and the FMCW signal 330 generated at the second device 310 may have similar FMCW structures. For example, both signals may be wideband signals (e.g., may span a full BW 370 of the OFDM channel 315), may span a duration of a symbol 380 in the OFDM channel 315, may be associated with the starting frequency 390, and may be associated with the slope 385. In some examples, the FMCW signal 320 transmitted by the first device 305 may be a real signal. For example, the FMCW signal 320 may include a single stream (e.g., a cosine stream, as shown in Equation 1). The FMCW signal 330 generated by the second device 310 may include two streams (e.g., a sinusoidal stream and a cosine stream) for channel estimation. That is, the exponential function in the FMCW signal 330 generated by the second device 310 may be designed for channel estimation. In some examples, the second device 310 may be configured with a function for generating the FMCW signal 330 for channel estimation, or the second device 310 may receive a control message that indicates the function for generating the FMCW signal 330 for channel estimation.

After generating the FMCW signal 330 configured for channel estimation, the second device 310 may generate a combined FMCW signal 335 (e.g., $y_{mixed}(t)$). To generate the combined FMCW signal 335, the second device 310 may combine the FMCW signal 325 received at the second device 310 with the locally generated FMCW signal 330 using a mixer 350. The mixer 350 may represent an example of one or more components (e.g., hardware, software, or both) of the second device 310 that are configured to combine two or more time-domain FMCW signals. In some examples, the combining may include multiplying the FMCW signals (e.g., $y_{mixed}(t)=y_{RF,Rx}(t)x_{RF,Rx}(t)$).

The second device 310 may filter the combined FMCW signal 335 using a low pass filter (LPF) 360 at the second device 310. The LPF 360 may generate a combined and filtered FMCW signal 340 (e.g., $y_{mixed,LPF}(t)$). The LPF 360 may represent an example of a component of the second device 310 that is configured to filter signals, or a function supported by the second device 310, or both. For example, the second device 310 may apply an LPF function to the combined FMCW signal 335 (e.g., $y_{mixed,LPF}(t)=\mathrm{LPF}[y_{RF,RX}(t)x_{RF,UE}(t)]$). The combined and filtered FMCW signal 340 may be represented by Equation 5.

$$y_{mixed,LPF}(t)=\sum_{p=0}^{P-1}\frac{A_p}{2}\exp\left(-j\left(2\pi\left(f_c-\frac{S}{2}\tau_p\right)\tau_p+\phi_{Rx}-\phi_{Tx}\right)\right)\exp(-j2\pi S\tau_p\cdot t)+\tilde{n}(t) \quad (5)$$

Equation 5 may be simplified according to Equation 6.

$$y_{mixed,LPF}(t)=\sum_{p=0}^{P-1}\beta_p\exp(-j2\pi S\tau_p\cdot t)+\tilde{n}(t), \text{ where } \beta_p=\frac{A_p}{2}\exp(-j(2\pi f_c\tau_p))\exp\left(j\left(2\pi\left(\frac{S}{2}\tau_p\right)\tau_p-\phi_{Rx}+\phi_{Tx}\right)\right) \quad (6)$$

In some examples, the second exponential function in $\beta_p$ may represent a channel estimation error that may be ignored to further simplify Equation 6. For example, one half of the second exponential function of $\beta_p$ (e.g., $$\frac{1}{2}\exp\left(j\left(2\pi\left(\frac{S}{2}\tau_p\right)\tau_p-\phi_{Rx}+\phi_{Tx}\right)\right))$$

may be associated with channel estimation error. However, if a value of $\tau_p$ is relatively small, the channel estimation error may also be relatively small (e.g., negligible). In some examples, the channel noise included in the radio frequency FMCW signal 325 (e.g., $y_{RF,Rx}(t)$) that is received by the second device 310 may be represented by $\tilde{n}(t)$ after the signal is combined with the generated FMCW signal 330 and filtered using the LPF 360. As described with reference to Equation 3, the channel noise $\tilde{n}(t)$ may be associated with a relatively small value relative to the other values that define the combined and filtered FMCW signal 340 shown in Equations 5 and 6.

After combining and filtering the FMCW signals, the second device 310 may perform frequency domain OFDM channel estimation using time-domain signal processing based on sampling the combined and filtered FMCW signal 340. The second device 310 may use an ADC 365 to sample the combined and filtered FMCW signal 340 in the time domain. A sampling rate used to sample the combined and filtered FMCW signal 340 may be based on one or more parameters associated with the OFDM channel 315. For example, the sampling rate may be based on a frequency range of one or more subbands in the OFDM channel 315 (e.g., the sampling rate, $$\frac{1}{T_s},$$

may be equal to an inverse of $$T_s=\frac{1}{F_s}=\frac{f_{subband}}{S}).$$

The subband frequency range, $f_{subband}$, may represent a granularity at which the second device 310 can estimate the OFDM channel 315 in the frequency domain.

The sampling by the second device 310 as part of the OFDM channel estimation may produce a sampling sequence, $D_{Rx}(k)$, which may represent a set of values associated with the OFDM channel estimation. The sampling sequence may have a granularity of $f_{subband}$. For example, each value of $D_{Rx}(k)$ may represent an example of an estimated value of a respective frequency subband of the OFDM channel 315. The sampling sequence, $D_{Rx}(k)$, is shown by Equation 7.

$$D_{Rx}(k)=\sum_{p=0}^{P-1}\beta_p\exp\left(-j2\pi S\tau_p\cdot k\cdot\frac{S}{F_s}\right)+\tilde{n}(t)=\sum_{p=0}^{P-1}\beta_p\exp(-j2\pi\tau_p\cdot k\cdot f_{subband})+\tilde{n}(t),\ k=0,1,\ldots,K-1 \quad (7)$$

In the example of Equation 7, $F_S$ may represent the sampling rate used by the second device 310 to estimate the OFDM channel 315. K may represent a total quantity of subbands in the OFDM channel 315, which may also correspond to a total quantity of samples in the sampling sequence. Accordingly, each value of k may represent an index of a respective subband of the total quantity of subbands. In one example, if the subband frequency range $f_{subband}$ of the OFDM channel 315 is equal to the bandwidth of one resource element, then the sampling sequence may include a respective sample or estimated value of each resource element in the OFDM channel 315 (e.g., per comb). In some examples, the subband frequency range $f_{subband}$ may be any other granularity, such as the bandwidth of a set of two or more resource elements, a resource block, or some other frequency range.

The second device 310 may thereby estimate the frequency domain OFDM channel 315 using time domain signal processing and with a granularity of $f_{subband}$ based on the FMCW signal 325 received at the second device 310 and the FMCW signal 330 generated by the second device 310. The described FMCW-based OFDM channel estimation techniques may be performed by the second device 310 in the time domain using time domain signal processing. That is, the second device 310 may refrain from applying FFT or other frequency transforms when using the FMCW signals to estimate the frequency domain OFDM channel 315. By performing the OFDM channel estimation in the time domain, the second device 310 may reduce processing complexity, latency, and power consumption as compared with other OFDM channel estimation techniques performed at least partially in the frequency domain (e.g., using FFT). Additionally, or alternatively, the second device 310 may estimate the frequency domain OFDM channel 315 using both wideband radio frequency processing and narrowband radio frequency processing. For example, the FMCW signal 325 received at the second device 310 may be a wideband signal in the radio frequency, and after the LPF 360, the combined and filtered FMCW signal 340 may be a narrow-band signal for baseband processing.

The sampling rate used by the second device 310 to estimate the frequency domain OFDM channel 315 using FMCW signals may be relatively low. The sampling rate described herein may be based on the slope 385 of the FMCW signals and the frequency granularity $f_{subband}$. For example, the sampling rate may be equal to $$\frac{S}{f_{subband}} = \frac{N_{RE} \cdot \Delta f \cdot \Delta f}{k_{subband} \cdot \Delta f} = \frac{N_{RE} \Delta f}{k_{subband}},$$

where $k_{subband}$ represents a quantity of resource elements in each frequency subband (e.g., each sampled portion of the frequency domain OFDM channel 315). A sampling rate of some OFDM-based OFDM channel estimation techniques (e.g., as described with reference to FIG. 2) may be equal to a product of an FFT size, $N_{FFT}$, and an SCS, Δf (e.g., $N_{FFT} \cdot \Delta f$). Thus, a ratio of the sampling rate of the FMCW-based OFDM channel estimation described herein relative to the OFDM-based OFDM channel estimation techniques may be represented by γ, as shown in Equation 8.

$$\gamma = \frac{N_{RE} \cdot \Delta f}{k_{subband} \cdot \Delta f \cdot N_{FFT}} = \frac{N_{RE}}{k_{subband} \cdot N_{FFT}} \tag{8}$$

As shown by Equation 8, the ratio between the sampling rate of the FMCW-based OFDM channel estimation techniques and the OFDM-based OFDM channel estimation techniques may be relatively low. That is, the sampling rate of the FMCW-based OFDM channel estimation techniques may be relatively low compared to the OFDM-based OFDM channel estimation techniques. In one example, if there are 273*12 resource elements in the BW 370 (e.g., $N_{RE}$=273*12), and each subband includes a single resource element (e.g., $k_{subband}$=1), the ratio may be equal to 0.8. That is, in such cases, the FMCW-based OFDM channel estimation techniques may produce an ADC sampling gain of approximately 20 percent. In some examples, each subband may include 48 resource element (e.g., $k_{subband}$=48), where the ratio may be equal to 0.016.

Table 2 includes example sampling rates to achieve accurate estimations of the frequency domain OFDM channel 315 using the FMCW-based OFDM channel estimation techniques described herein in comparison with example sampling rates to achieve accurate estimations of the frequency domain OFDM channel 315 using other OFDM channel estimation techniques in the frequency domain, as described with reference to FIG. 2. The example sampling rates shown in Table 2 represent example sampling rates that may be used by the second device 310 to accurately estimate the OFDM channel 315 with a granularity of four resource blocks 375 when the channel BW 370 is 50 MHz.

TABLE 2

Comparison Of Sampling Rates For Different Channel Estimation Techniques

| | FMCW-Based OFDM Channel Estimation In The Time Domain | | OFDM Channel Estimation In The Frequency Domain |
|---|---|---|---|
| | \|S\| ($10^{12}Hz^2$) | Fs (MHz) | Fs (MHz) |
| 15 kHz SCS Tsym = 66.67 usec, w/o CP fsubband = 0.72 MHz | 0.75 | 1.04 | 61.44 |
| 30 kHz SCS Tsym = 33.33 usec, w/o CP fsubband = 1.44 MHz | 1.5 | 1.04 | 61.44 |
| 60 kHz SCS Tsym = 16.67 usec, w/o CP fsubband = 2.88 MHz | 3 | 1.04 | 61.44 |
| 120 kHz SCS Tsym = 8.333 usec, w/o CP fsubband = 5.76 MHz | 6 | 1.04 | 61.44 |

As shown in Table 2, the FMCW-based channel estimation techniques described herein may reduce the sampling rate by a relatively large amount relative to OFDM-based channel estimation. For example, a sampling rate used by the second device 310 to estimate the OFDM channel 315 with a granularity of four resource blocks 375 when the channel BW 370 is 50 MHz and using FMCW signals may be approximately 1.69 percent of the sampling rate that may be used by the second device 310 if OFDM-based channel estimation is performed in the same scenario.

The FMCW-based OFDM channel estimation described herein may reliably estimate the frequency domain OFDM channel 315 using the reduced sampling rate. For example, an accuracy of the FMCW-based OFDM channel estimation techniques may be relatively similar to an accuracy of OFDM-based OFDM channel estimation techniques using frequency domain reference signals across a range of packet delay protocols, SCS values, and BWs when compared with benchmark values. That is, the described techniques may maintain or improve accuracy and reliability of estimations of frequency domain OFDM channels 315 while reducing processing and power consumption.

However, the FMCW waveform signals from the first device 305 may occupy an entire frequency resource allocation for the signaling, such as the BW 370 over the duration of the symbol 380. That is, a FMCW waveform generated by the VCO 345 (e.g., an analog VCO) may occupy the BW 370, such that the first device 305 may be unable to multiplex FMCW waveform signals across multiple reference signal ports in FDM, which may cause inefficiencies due to resource allocation to respective reference signal ports.

In some cases, to improve resource allocation for multi-port reference signal transmission and reception, a first device 305 may indicate FMCW waveform parameters to a second device 310 for communicating an FMCW reference signal via the multiple ports. For example, the first device 305 may send an indication of a chirp duration for communicating the FMCW reference signal (e.g., where the chirp duration may be inversely proportional to a quantity of ports), a time-domain offset for respective ports to communicate the FMCW reference signal, a chirp BW for communicating the FMCW reference signal, or any combination thereof, which is described in further detail with respect to FIGS. 5A and 5B. The transmitting device 205 may also send a control message (e.g., scheduling message) indicating one or more time-frequency resources for the FMCW reference signal and the ports for the FMCW reference signal. The transmitting device 205 may transmit a CSI-RS to the second device 310 using the time-frequency resources and the FMCW waveform parameters. Additionally, or alternatively, the second device 310 may transmit one or more SRSs using the time-frequency resources and the FMCW waveform parameters. The first device 305 and the second device 310 may use the FMCW reference signals for OFDM channel estimation.

Figure 4:
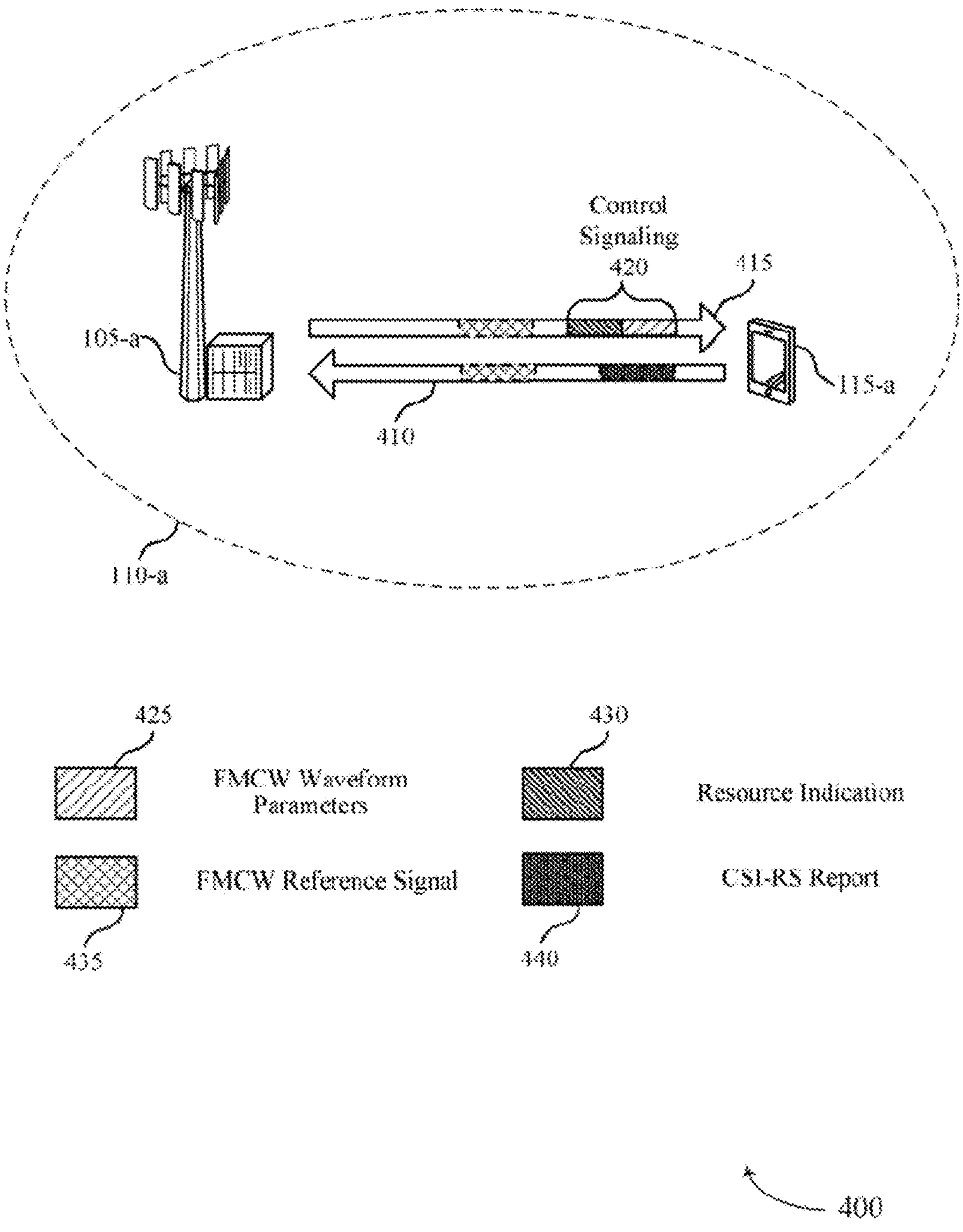
FIG. 4 illustrates an example of a wireless communications system that supports multi-port reference signal transmission for a FMCW waveform in accordance with one or more aspects of the present disclosure.

FIG. 4 illustrates an example of a wireless communications system 400 that supports multi-port reference signal transmission for a FMCW waveform in accordance with one or more aspects of the present disclosure. The wireless communications system 400 may implement or be implemented by aspects of the wireless communications system 100, the OFDM channel estimation scheme 200, or the OFDM channel estimation scheme 300 as described with reference to FIGS. 1 through 3. For example, the wireless communications system 400 may include a network entity 105-*a* and a UE 115-*a*, which may represent examples of a network entity 105 and a UE 115 as described with reference to FIGS. 1-3. The network entity 105-*a* may communicate with the UE 115-*a* within a geographic coverage area 110-*a* and via an uplink communication link 410 and a downlink communication link 415. In this example, the network entity 105-*a* may transmit control signaling 420 to the UE 115-*a* including one or more FMCW waveform parameters 425 and a resource indication 430 for one or more FMCW reference signals 435 sent over multiple ports.

The network entity 105-*a* and the UE 115-*a* may represent examples of transmitting and receiving devices. As used herein, the transmitting device may refer to the wireless device that transmits an FMCW reference signal 435, and the receiving device may refer to the wireless device that receives the FMCW reference signal 435. Accordingly, in the example illustrated in FIG. 4, either of the network entity 105-*a* or the UE 115-*a* may be the transmitting device and either of the UE 115-*a* or the network entity 105-*a* may be the receiving device, which may represent examples of the first device 305 and the second device 310 described with reference to FIG. 3.

The UE 115-*a* may establish a connection with the network entity 105-*a* for wireless communications via the uplink communication link 410 and the downlink communication link 415. For examples, the UE 115-*a* may transmit control signaling, data, or both to the network entity 105-*a* via the uplink communication link 410, and the network entity 105-*a* may transmit control signaling (e.g., the control signaling 420), data, or both to the UE 115-*a* via the downlink communication link 415.

In some examples, the UE 115-*a*, the network entity 105-*a*, or both may support multi-port communications. For example, the UE 115-*a*, the network entity 105-*a*, or both may transmit and/or receive one or more signals, where each signal is sent or received via a different port. A port may be referred to as an antenna port, and each port may have a defined resource grid, set of reference signals, and may be assigned to a channel. In some cases, the UE 115-*a*, the network entity 105-*a*, or both may use FMCW-based reference signal transmissions to improve the efficiency of OFDM channel estimation, as described with reference to FIGS. 2 and 3. However, to support multi-port reference signal transmission using an FMCW waveform, the network entity 105-*a* may transmit control signaling 420 indicating one or more FMCW waveform parameters 425. For example, the network entity 105-*a* may transmit control signaling 420 (e.g., RRC signaling, a MAC-CE, a DCI message, or the like) indicating a chirp duration for communicating one or more FMCW reference signals 435 (e.g., where the chirp duration may be inversely proportional to a quantity of ports), a time-domain offset for respective ports to communicate the FMCW reference signals 435, a chirp BW for communicating the FMCW reference signals 435, or any other FMCW waveform parameter.

In some examples, the FMCW reference signal 435 may be a CSI-RS from the network entity 105-*a* (e.g., via the downlink communication link 415). In some other examples, the FMCW reference signals 435 may be one or more SRSs from the UE 115-*a* to the network entity 105-*a* (e.g., via the uplink communication link 410). The network entity 105-*a* may indicate which ports for the UE 115-*a* to use to transmit or receive the FMCW reference signals 435 (e.g., SRS, CSI-RS) in the control signaling 420 and the FMCW waveform parameters including a BW and a slope in the time-frequency domain for the FMCW reference signal 435 transmission. In some cases, the network entity 105-*a* or the UE 115-*a* may transmit the FMCW reference signal 435, such as the CSI-RS or the SRS, respectively, using a quantity of ports, $N_{port}$, where each port may have a different offset in the time domain, $\Delta_i$, which is described in further detail with respect to FIGS. 5A and 5B. The network entity 105-*a* may indicate $N_{port}$ to the UE 115-*a* (e.g., in the control signaling 420) for the UE 115-*a* to use to transmit or receive the FMCW reference signals 435.

In some cases, if the interval between the ports, $$\{\Delta_i\}_{i=1}^{N_{port}},$$

is equal and the offsets start from 0 and/or the network entity 105-*a* configures the value of the starting offset, $\Delta_0$, then $\Delta_i$ can be calculated by $\Delta_i=(i-1)\Delta_0$. In some other cases, if $$\{\Delta_i\}_{i=1}^{N_{port}}$$

is not equal, then the network entity 105-*a* may separately configure each $\Delta_i$ (e.g., via the control signaling 420 in the FMCW waveform parameters 425). If $\Delta_i$ is greater than or equal to the duration of a chirp, $T_{chirp}$, (e.g., if $\Delta_i \geq T_{chirp}$) the FMCW reference signals 435 may have non-overlapping time-frequency resources for each port, which is described in further detail with respect to FIG. 5A. Otherwise, if $\Delta_i$ is less than $T_{chirp}$ (e.g., if $\Delta_i < T_{chirp}$), the FMCW reference signals 435 may have overlapping time-frequency resources for each port, which is described in further detail with respect to FIG. 5B. To perform channel estimation for multiple equal-interval subbands, the network entity 105-*a* may configure values of a BW per subband, $BW_{subband}$, or a quantity of subbands, $N_{subband}$, such as via the control signaling 420 in the FMCW waveform parameters 425.

In some examples, the network entity 105-*a* may transmit a resource indication 430 in the control signaling 420 that schedules one or more time-frequency resources for the FMCW reference signals 435. For example, the resource indication 430 may indicate a starting frequency and time for an SRS transmission from the UE 115-*a* or a CSI-RS transmission from the network entity 105-*a*. Additionally, or alternatively, the resource indication 430 may indicate the ports for the FMCW reference signal 435. The UE 115-*a* may use the time-frequency resources to transmit the SRSs via the ports or may monitor the time-frequency resources to receive the CSI-RSs via the ports in accordance with the FMCW waveform parameters 425.

Figure 5A:
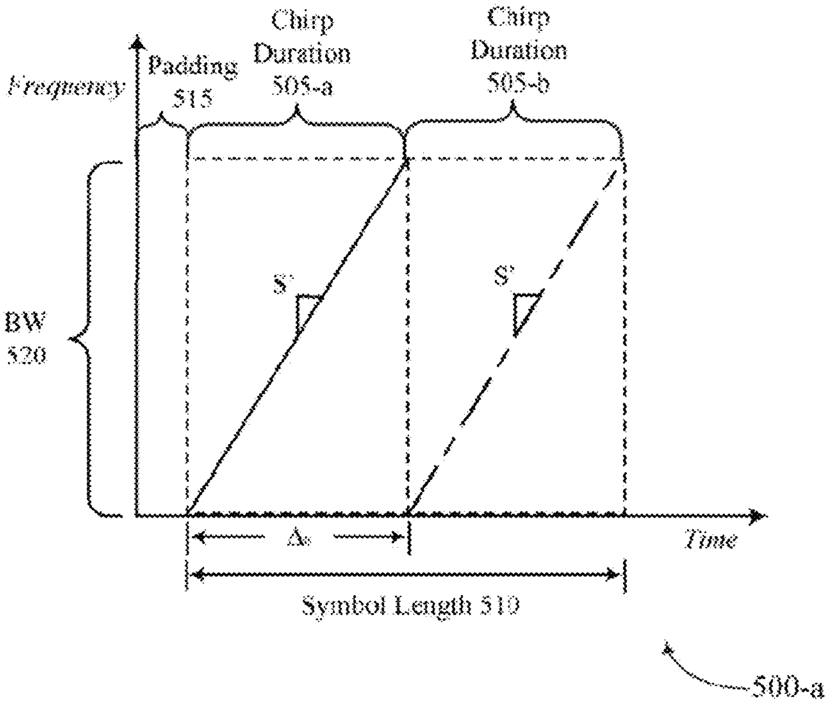
FIGS. 5A and 5B illustrate examples of resource diagrams that support multi-port reference signal transmission for a FMCW waveform in accordance with one or more aspects of the present disclosure.
Figure 5B:
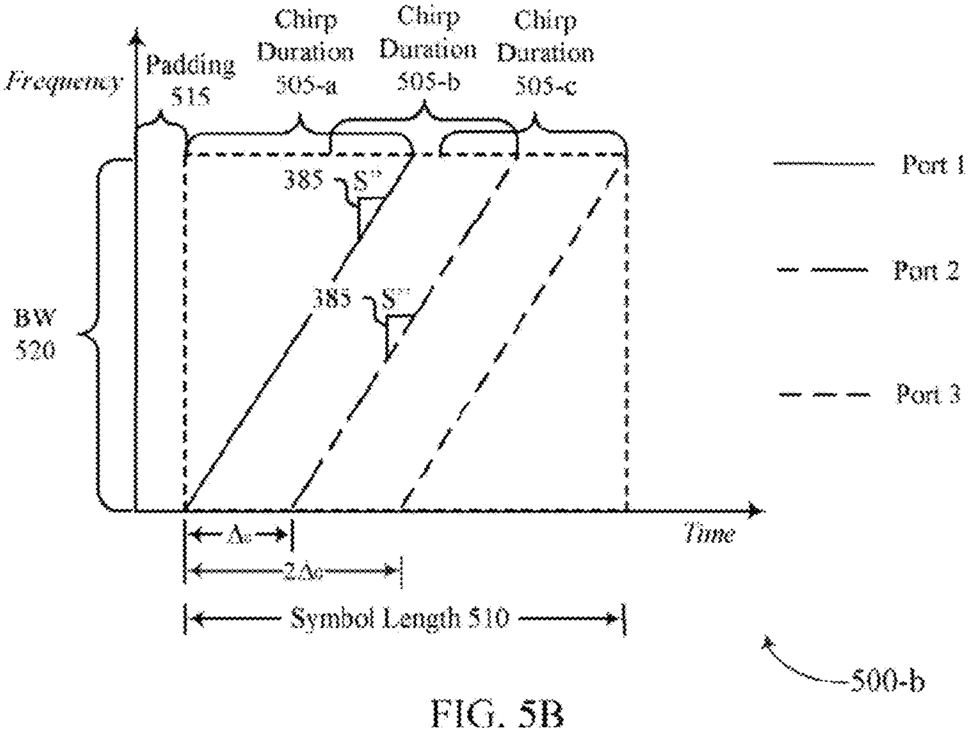

In some examples, if the time-frequency resources for the FMCW reference signals 435 are overlapping, the UE 115-*a*, the network entity 105-*a*, or both may perform a post-processing procedure to separate the signal of each port, which is described in further detail with respect to FIG. 5B. For example, the UE 115-*a*, the network entity 105-*a*, or both may perform a frequency shifting operation and apply a LPF to the FMCW reference signal to separate each port of the plurality of ports. If the FMCW reference signal is a CSI-RS, the UE 115-*a* may measure the CSI-RS of the respective ports. The ULE 115-*a* may transmit a CSI-RS report 440 indicating the respective measurements to the network entity 105-*a*.

FIGS. 5A and 5B illustrate examples of a resource diagram 500-*a* and a resource diagram 500-*b* that support multi-port reference signal transmission for a FMCW waveform in accordance with one or more aspects of the present disclosure. In some examples, the resource diagram 500-*a* and the resource diagram 500-*b* may implement or may be implemented by aspects of wireless communications system 100, the OFDM channel estimation scheme 200, the OFDM channel estimation scheme 300, or the wireless communications system 400 as described with reference to FIGS. 1 through 4. For example, the resource diagram 500-*a* and the resource diagram 500-*b* may be implemented by a wireless communications system in which a transmitting device transmits one or more FMCW reference signals via multiple ports in accordance with FMCW waveform parameters.

In some examples, the transmitting device may be an example of a network entity or a UE (e.g., a network entity 105 and a UE 115) as described with reference to FIGS. 1 through 4. The FMCW reference signals may include SRSs, CSI-RSs, or any other reference signal. In some cases, transmitting device may transmit the FMCW reference signals, such as the CSI-RSs or the SRSs, using a quantity of ports, $N_{port}$, where each port may have a different offset in the time domain, $\Delta_i$. For example, the transmitting device may use Port 1 to send a chirp for a FMCW reference signal with a chirp duration 505-*a*, Port 2 to send a chirp for a FMCW reference signal with a chirp duration 505-*b*, and Port 3 to send a chirp for a FMCW reference signal with a chirp duration 505-*c*. Although FIGS. 5A and 5B illustrate the use of two and three ports, respectively, the transmitting device may use any quantity of ports for the FMCW reference signal transmission. Similarly, the transmitting device may send any quantity of FMCW reference signals using the ports.

In some cases, the chirps may span a symbol length 510. A duration or length of each symbol, such as the symbol length 510, may correspond to a length of an OFDM symbol, or a length of an OFDM symbol and a respective CP duration, or a partial length of an OFDM symbol, or a partial length of an OFDM symbol and a respective CP duration, or some other length longer than the length of the OFDM symbol and the length of the OFDM symbol and CP duration, or some other symbol duration, or any combination thereof. In some cases, there may be a duration between each symbol, which may be referred to as a cycle prefix, zero padding, or padding 515. The padding 515 may be in front of Port 1 or every port. In some cases, a network entity may configure a starting offset in the time domain, $\Delta_0$, for a multi-port FMCW reference signal transmission. Similarly, the network entity may configure respective values for ai for each port. In some cases, the offset in the time domain for each port may be the same, such that each offset is a factor of Do. For example, as shown in resource diagram 500-*b*, the offset for Port 1 may be 0, the offset for Port 2 may be $\Delta_0$, and the offset for Port 3 may be $2\Delta_0$. In some other examples, the chirp via Port 1 may not start at the beginning of the symbol, each port may have different offsets, or both.

In some examples, the transmitting device may send the FMCW reference signals with multiple ports via TDM (e.g., without mutual overlapping between chirps of different ports). That is, the starting offset for the chirp in the time domain, $\Delta_0$, may be greater than or equal to a chirp duration. For example, the resource diagram 500-*a* illustrates an example where the chirp duration 505-*a* is equal to Do. The transmitting device may send the chirp for a decreased chirp duration relative to an FMCW reference signal transmission via a single port. By decreasing the chirp duration, the transmitting device may increase a chirp slope when compared with a chirp slope for a single port FMCW reference signal transmission, S (e.g., the chirp slope 385 as described with reference to FIG. 3). For example, the transmitting device may send the chirp for a chirp duration, $$T_{chirp} = \frac{T_{sym}}{N_{port}},$$

where $T_{sym}$ is the symbol length 510, which may increase the chirp slope to S', where $S'=N_{port}S$.

The transmitting device may send a chirp using Port 1 for a chirp duration 505-*a* and according to a BW 520 and a chirp using Port 2 for a chirp duration 505-*b* and according to the BW 520, such that the slope for the chirps is S' for a symbol length 510 and a $\Delta_0$ equal to the chirp duration 505-*a*. In some cases, the chirp duration 505-*a* may be the same as the chirp duration 505-*b*, such that the slopes for the FMCW reference signal transmissions using Port 1 and Port 2 may be the same. In some other cases, the chirp duration 505-*a* may be different than the chirp duration 505-*b*, such that the slopes for the FMCW reference signal transmissions using Port 1 and Port 2 may be different. Because the sampling rate is directly proportional to the slope (e.g., equal to $$\left.\frac{S'}{BW_{subband}}\right),$$

the sampling rate may increase by a factor of $N_{port}$ when compared with a single-port transmission.

In some examples, the transmitting device may send the FMCW reference signals with multiple ports concurrently (e.g., with partial overlapping between chirps of different ports). That is, the $\Delta_0$ may be less than a chirp duration. For example, the resource diagram 500-*b* illustrates an example where the $\Delta_0$ is less than the chirp duration 505-*a*, the chirp duration 505-*b*, and the chirp duration 505-*c*, for Port 1, Port 2, and Port 3, respectively. For example, the chirp duration 505-*a* partially overlaps in the time domain with the chirp duration 505-*b*, and the chirp duration 505-*c* partially overlaps in the time domain with the chirp duration 505-*b*. The chirp duration 505-*a*, the chirp duration 505-*b*, and the chirp duration 505-*c* span the symbol length 510 and the BW 520, such that the slope for the chirps may be S".

A single port FMCW waveform signal output may be represented as a function of time in accordance with Equation 9.

$$f_{Tx}(t) = f_c + St \tag{9}$$

where $f_c$ is the starting frequency of the transmission. After experiencing a multi-path channel, multiplying with a local FMCW wave, and passing the LPF at the receiver, the output signal may be calculated using Equation 6 (e.g., $y_{mixed,LPF}(t)$) where $0 \le t \le T_{sym}$. The output of Equation 6 may be regarded as the modulation of an aggregation of multiple carriers with frequencies, $f_p$, where $f_p = S\tau_p$. To avoid interfering with a following symbol, the maximum value of $\tau_p$, may be $$\max_p \tau_p \le CP, \; so \;\; f_p \le f_{p,max} = S \cdot$$

$$CP = \frac{BW \cdot CP}{T_{chirp}}.$$

A multiple port FMCW waveform signal output may be represented as a function of time in accordance with Equation 10.

$$\tilde{f}_{Tx}(t) = f_c + S(t - \Delta_0) = f_c - S\Delta_0 + St \tag{10}$$

After experiencing a multi-path channel, multiplying with a local FMCW wave, and passing the LPF at the receiver, the output signal may be calculated according to Equation 11.

$$\tilde{y}_{mixed,LPF}(t) = \sum_{p=0}^{P-1} \tilde{\beta}_p \exp(-j2\pi S(\tau_p + \Delta_0) \cdot t), \tag{11}$$

$$\text{where } \tilde{\beta}_p = \frac{A_p}{2} \exp(-j2\pi f_c \tau_p) \exp\left(j\pi S\left(\tau_p^2 + 2\Delta_0 \tau_p\right)\right) \exp(j\phi_{UE} + j\phi_{gNB})$$

The output of Equation 11 (e.g., $\tilde{y}_{mixed,LPF}(t)$) may be regarded as the modulation of an aggregation of multiple carriers with frequencies $\tilde{f}_p = S(\tau_p + \Delta) \ge S\Delta_0$. If $S\Delta_0 \ge f_{p,max}$, $\{f_p\}$ and $\{\tilde{f}_p\}$ may not overlap.

In some examples, if FMCW reference signals for each port partially overlap, such as for resource diagram 500-*b*, a multiple port FMCW waveform signal output for each port may be represented by Equation 12.

$$f_{Tx,i}(t) = f_c + S(t - \Delta_i), \; i = 1 \sim N_{port} \tag{12}$$

where the time-domain offset for each port $\Delta_i = (i-1)\Delta_0$, and $$\max_p \tau_p \le \Delta_0 << T_{sym}.$$

In some cases, the transmitting device may add zero padding in front of the symbol to account for inter-symbol interference for multiple path delays. The receiver (e.g., a UE) may separate $$\{y_{mixed,LPF,i}(t)\}_{i=1}^{N_{port}},$$

and may estimate the channels for each reference signal port.

For concurrent transmissions across multiple ports (e.g., $N_{port}$-port transmission) through a multi-path channel the receiver may perform a post-processing procedure. For example, the receiver may multiply an FMCW reference signal by a local FMCW wave and pass the result through a LPF, which may result in a signal after applying Equation 13.

$$\tilde{y}_{mixed,LPF,all}(t) = \sum_{i=1}^{N_{port}} y_{mixed}{}_i(t) = \sum_{i=1}^{N_{port}} \sum^{P-1} \tilde{\beta}_{i,p} \exp(-j2\pi S(\tau_{i,p} + \Delta_i) \cdot t), \text{ where} \tag{13}$$

$$\tilde{\beta}_{i,p} = \exp(-j2\pi f_c \tau_p) \exp\left(j\pi S\left(\tau_p^2 + 2\Delta_i \tau_p\right)\right) \exp(j\phi_{UE} + j\phi_{gNB})$$

In some examples, the output of Equation 13 (e.g., $\tilde{y}_{mixed,LPF,all}(t)$) may be regarded as the modulation of an aggregation of multiple carriers with frequencies $\{f_{i,p} = S(\tau_p + \Delta_i)\}_{i,p}$. Thus, the frequency groups of different ports are non-overlapping if $$\Delta_0 \ge \max_p \tau_p.$$

The receiving device may separate the signal from each port (e.g., the chirp for Port 1 from the chirp for Port 2 and the chirp for Port 3 from the chirp for Port 2) by performing frequency shifting and applying an LPF. The receiving device may perform channel estimation for a first port (e.g., Port 1) by sampling in the time domain according to Equation 14.

$$z_n = \tilde{y}_{mixed,LPF,all}(nT_s), \; n = 0 \sim N_{subband} \tag{14}$$

The receiving device may apply a digital-domain LPF to the output of Equation 14

$$(\text{e.g., } z_n)$$

with a cutoff frequency $S\Delta_0$, and may estimate the channel as described with reference to FIGS. 2 and 3. The receiving device may perform channel estimation for each subsequent port (e.g., Port i>1) by performing frequency shifting for the sampling in the time domain according to Equation 15.

$$z_n^{(i)} = z_n e^{j2\pi(n-1)T_s S\Delta_i} \tag{15}$$

The receiving device may apply a digital-domain LPF to the output of Equation 15

$$(\text{e.g., } z_n^{(i)})$$

with a cutoff frequency of $S\Delta_0$, and may estimate the channel as described with reference to FIGS. 2 and 3.

In some examples, the slope of the chirps with an overlapping chirp duration, $S_{multi}$, such as for the resource diagram 500-*b*, may be larger than a slope for a single-port waveform, $S_{single}$. For example, if $N_{port}$ ports are multiplexed, $$S_{multi} = \frac{BW}{T_{sym} - (N_{port} - 1)\Delta_0} > \frac{BW}{T_{sym}} = S_{single}.$$

Due to $$F_s = \frac{S}{f_{subband}},$$

to obtain the channel responses of the same subbands, multi-port transmission may result in an increase in sampling rate, $$F_{s,multi}\left(\text{e.g., } F_{s,multi} = \frac{S_{multi}}{f_{subband}} > F_{s,single} = \frac{S_{single}}{f_{subband}}\right).$$

However, because $\Delta 0 \ll T_{sym}$, the sampling increase may be relatively small (e.g., negligible) if $N_{port}$ is a relatively small quantity. The ratio of the sampling rate of a multi-port FMCW reference signal transmission with partially overlapping chirps over that of single-port FMCW reference signal transmission is $$\gamma_{sampling\_rate} = \frac{T_{sym}}{T_{sym} - (N_{port} - 1)\Delta_0}.$$

If $N_{port}=4$ and $\Delta 0=0.1T_{sym}$, then $\gamma_{sampling,rate}=1.43$. In comparison, the ratio of the sampling rate of a multi-port FMCW reference signal transmission with non-overlapping chirps over that of single-port FMCW reference signal transmission if $N_{port}=4$, then $\gamma_{sampiing\_rate}=4$.

Figure 6:
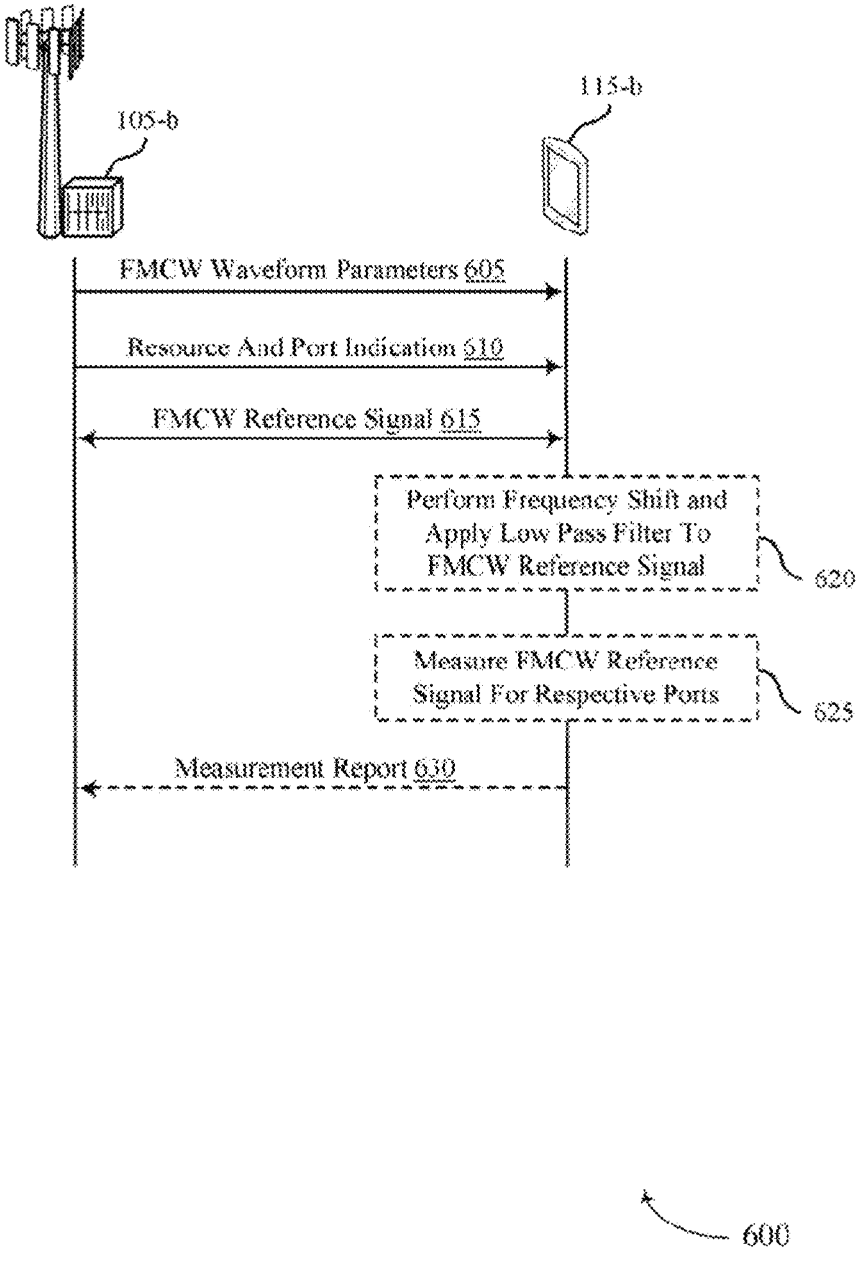
FIG. 6 illustrates an example of a process flow that supports multi-port reference signal transmission for a FMCW waveform in accordance with one or more aspects of the present disclosure.

FIG. 6 illustrates an example of a process flow 600 that supports multi-port reference signal transmission for a FMCW waveform in accordance with one or more aspects of the present disclosure. The process flow 600 may implement or may be implemented by aspects of wireless communications system 100, the OFDM channel estimation scheme 200, the OFDM channel estimation scheme 300, the wireless communications system 400, the resource diagram 500-*a*, or the resource diagram 500-*b* as described with reference to FIGS. 1 through 5B. For example, the process flow 600 illustrates communications between a network entity 105-*b* and a UE 115-*b*, which may represent aspects of corresponding devices as described with reference to FIGS. 1-4. In some examples, the devices may exchange signaling to support multi-port transmission of FMCW reference signals.

In the following description of the process flow 600, the operations between the network entity 105-*b* and a UE 115-*b* may be performed in different orders or at different times. Some operations may also be left out of the process flow 600, or other operations may be added. Although the network entity 105-*b* and the UE 115-*b* are shown performing the operations of the process flow 600, some aspects of some operations may also be performed by one or more other wireless devices.

At 605, the UE 115-*b* may receive an indication from the network entity 105-*b* of one or more FMCW waveform parameters for an FMCW reference signal. The one or more FMCW waveform parameters may include a chirp duration for the FMCW reference signal based on a quantity of ports, a time-domain offset for respective ports, a chirp BW for the FMCW reference signal, or any combination thereof. In some cases, the time-domain offset may be different for the respective ports. In some other cases, the time-domain offset may be the same for the respective ports.

At 610, the UE 115-*b* may receive a control message from the network entity 105-*b* indicating one or more time-frequency resources for the FMCW reference signal. The control message may additionally, or alternatively, indicate the ports for the FMCW reference signal. The network entity 105-*a* may send the control message including the FMCW waveform parameters or may send the control message independent of the FMCW waveform parameters. The control message may be RRC signaling, a MAC-CE, a DCI message, or any other type of control signaling.

At 615, the UE 115-*b* may transmit or receive (e.g., communicate) the FMCW reference signal using the time-frequency resources via multiple ports. The communications may be in accordance with the FMCW waveform parameters. In some cases, the UE 115-*b* may receive one or more CSI-RSs from the network entity 105-*b* via the ports and using the one or more time-frequency resources. In some other cases, the UE 115-*b* may transmit one or more SRSs to the network entity 105-*b* via the ports and using the one or more time-frequency resources.

In some cases, the network entity 105-*b*, the UE 115-*b*, or both may transmit or receive a first chirp of the FMCW reference signal using a first port in accordance with the one or more FMCW waveform parameters and a second chirp of the FMCW reference signal using a second port in accordance with the one or more FMCW waveform parameters. In some examples, the second chirp may be non-overlapping in time with the first chirp, as described with reference to FIG. 5A. In some other examples, the second chirp may be overlapping (e.g., partially overlapping) in time with the first chirp, as described with reference to FIG. 5B.

In some examples, at 620, the UE 115-*b*, the network entity 105-*b*, or both may perform a frequency shifting operation and may apply a LPF to the FMCW reference signal (e.g., a CSI-RS) to separate each port of the plurality of ports.

At 625, the UE 115-*b* may measure the FMCW reference signal at respective ports to obtain one or more reference signal measurements.

Figure 7:
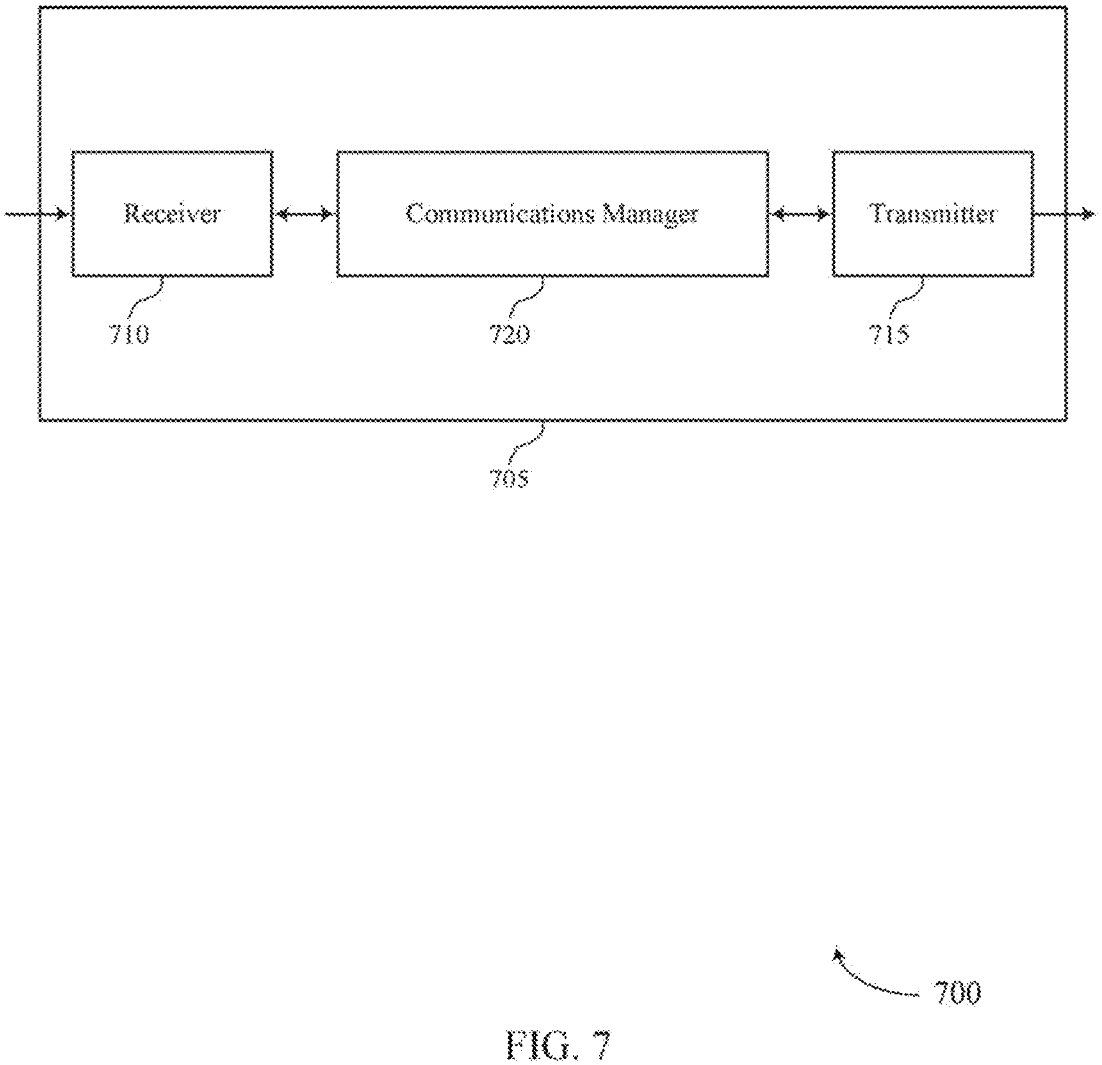
FIGS. 7 and 8 illustrate block diagrams of devices that support multi-port reference signal transmission for a FMCW waveform in accordance with one or more aspects of the present disclosure.

At 630, the UE 115-*b* may transmit a measurement report to the network entity 105-*b*. The measurement report may include one or more measurements of a CSI-RS FIG. 7 illustrates a block diagram 700 of a device 705 that supports multi-port reference signal transmission for a FMCW waveform in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to multi-port reference signal transmission for a FMCW waveform). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to multi-port reference signal transmission for a FMCW waveform). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of multi-port reference signal transmission for a FMCW waveform as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. For example, the communications manager 720 may be configured as or otherwise support a means for receiving an indication of one or more FMCW waveform parameters for an FMCW reference signal. The communications manager 720 may be configured as or otherwise support a means for receiving a control message indicating one or more time-frequency resources for the FMCW reference signal and indicating a set of multiple ports for the FMCW reference signal. The communications manager 720 may be configured as or otherwise support a means for communicating, using the one or more time-frequency resources, the FMCW reference signal via the set of multiple ports in accordance with the one or more FMCW waveform parameters.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for a network entity to transmit control signaling configuring a UE with FMCW waveform parameters for transmitting or receiving one or more FMCW reference signals via multiple ports, which may provide reduced processing, reduced power consumption, more efficient utilization of communication resources, and the like.

Figure 8:
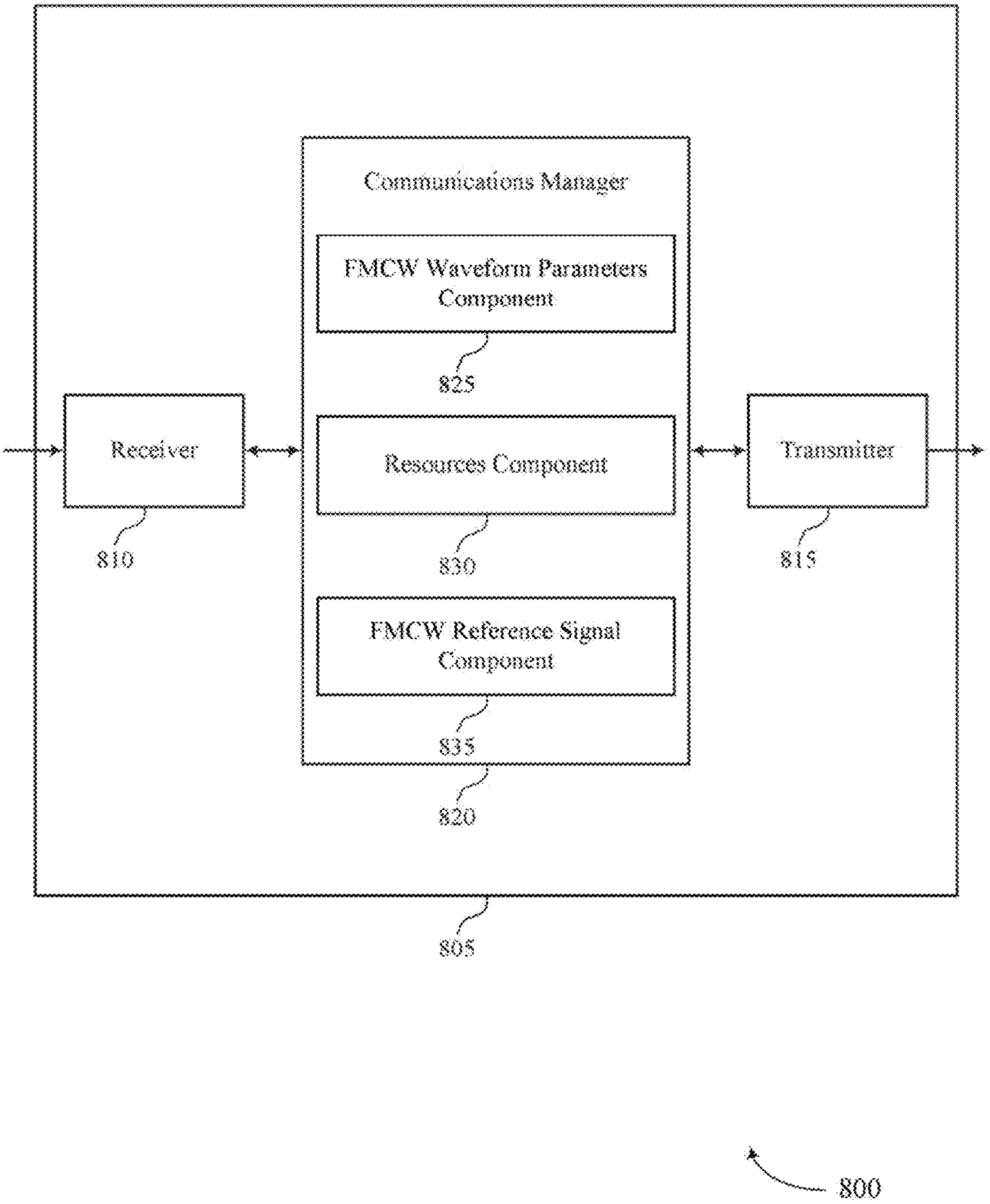

FIG. 8 illustrates a block diagram 800 of a device 805 that supports multi-port reference signal transmission for a FMCW waveform in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multi-port reference signal transmission for a FMCW waveform). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multi-port reference signal transmission for a FMCW waveform). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of multi-port reference signal transmission for a FMCW waveform as described herein. For example, the communications manager 820 may include an FMCW waveform parameters component 825, a resources component 830, an FMCW reference signal component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The FMCW waveform parameters component 825 may be configured as or otherwise support a means for receiving an indication of one or more FMCW waveform parameters for an FMCW reference signal. The resources component 830 may be configured as or otherwise support a means for receiving a control message indicating one or more time-frequency resources for the FMCW reference signal and indicating a set of multiple ports for the FMCW reference signal. The FMCW reference signal component 835 may be configured as or otherwise support a means for communicating, using the one or more time-frequency resources, the FMCW reference signal via the set of multiple ports in accordance with the one or more FMCW waveform parameters.

Figure 9:
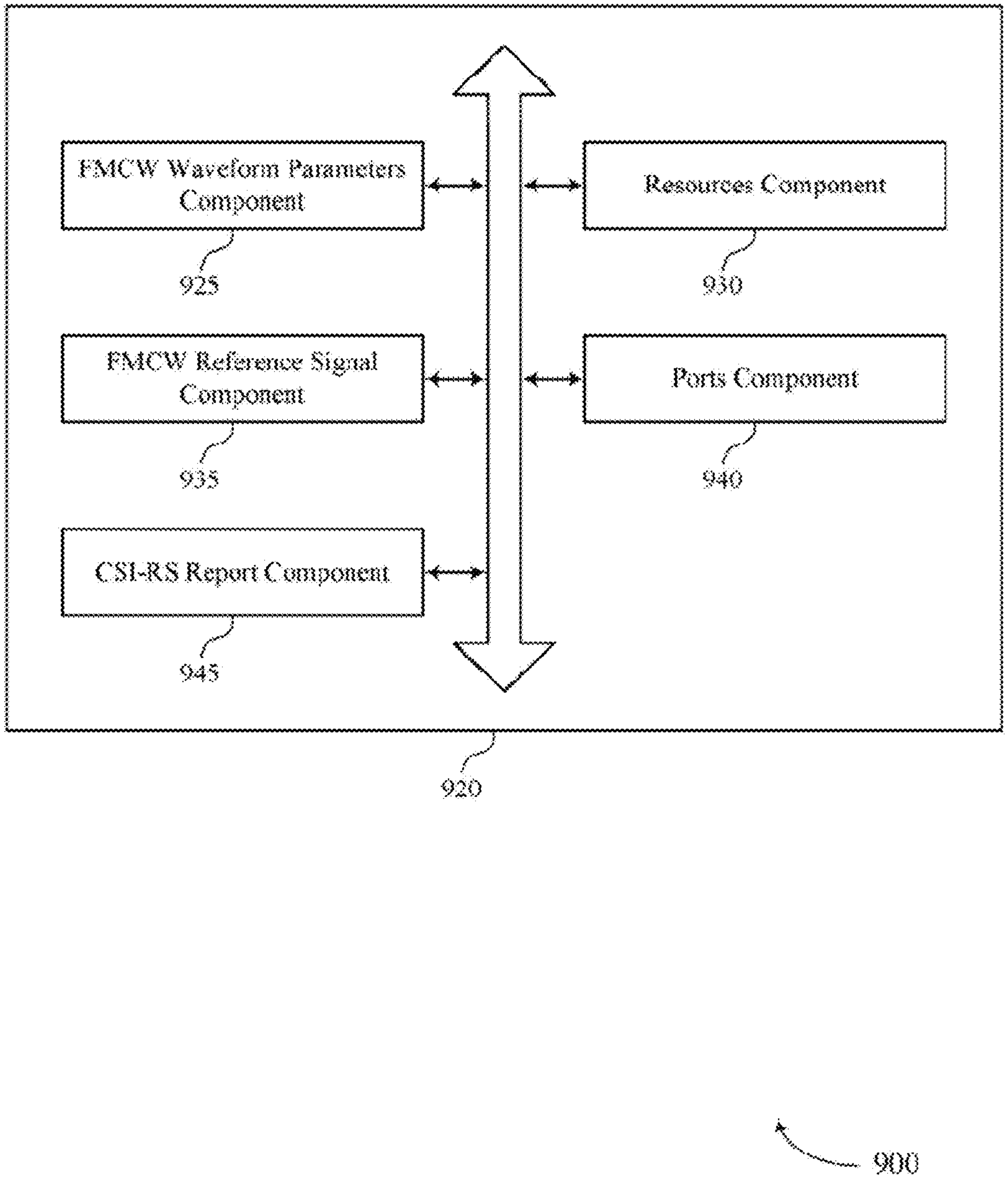
FIG. 9 illustrates a block diagram of a communications manager that supports multi-port reference signal transmission for a FMCW waveform in accordance with one or more aspects of the present disclosure.

FIG. 9 illustrates a block diagram 900 of a communications manager 920 that supports multi-port reference signal transmission for a FMCW waveform in accordance with one or more aspects of the present disclosure. The communications manager 920 may be an example of aspects of a communications manager 720, a communications manager 820, or both, as described herein. The communications manager 920, or various components thereof, may be an example of means for performing various aspects of multi-port reference signal transmission for a FMCW waveform as described herein. For example, the communications manager 920 may include an FMCW waveform parameters component 925, a resources component 930, an FMCW reference signal component 935, a ports component 940, a CSI-RS report component 945, or any combination thereof. Each of these components may communicate, directly or indirectly, with one another (e.g., via one or more buses).

The communications manager 920 may support wireless communications at a UE in accordance with examples as disclosed herein. The FMCW waveform parameters component 925 may be configured as or otherwise support a means for receiving an indication of one or more FMCW waveform parameters for an FMCW reference signal. The resources component 930 may be configured as or otherwise support a means for receiving a control message indicating one or more time-frequency resources for the FMCW reference signal and indicating a set of multiple ports for the FMCW reference signal. The FMCW reference signal component 935 may be configured as or otherwise support a means for communicating, using the one or more time-frequency resources, the FMCW reference signal via the set of multiple ports in accordance with the one or more FMCW waveform parameters.

In some examples, to support communicating the FMCW reference signal, the FMCW reference signal component 935 may be configured as or otherwise support a means for receiving a CSI-RS via the set of multiple ports using the one or more time-frequency resources, where the FMCW reference signal includes the CSI-RS.

In some examples, the CSI-RS report component 945 may be configured as or otherwise support a means for performing a frequency shifting operation and applying a LPF to the CSI-RS to separate each port of the set of multiple ports. In some examples, the CSI-RS report component 945 may be configured as or otherwise support a means for measuring the CSI-RS of respective ports of the set of multiple ports to obtain one or more measurements associated with the CSI-RS. In some examples, the CSI-RS report component 945 may be configured as or otherwise support a means for transmitting a report including the one or more measurements associated with the CSI-RS.

In some examples, to support communicating the FMCW reference signal, the ports component 940 may be configured as or otherwise support a means for communicating a first chirp of the FMCW reference signal using a first port of the set of multiple ports based on the one or more FMCW waveform parameters. In some examples, to support communicating the FMCW reference signal, the ports component 940 may be configured as or otherwise support a means for communicating a second chirp of the FMCW reference signal using a second port of the set of multiple ports based on the one or more FMCW waveform parameters, where the second chirp is non-overlapping in time with the first chirp.

In some examples, to support communicating the FMCW reference signal, the ports component 940 may be configured as or otherwise support a means for communicating a first chirp of the FMCW reference signal using a first port of the set of multiple ports based on the one or more FMCW waveform parameters. In some examples, to support communicating the FMCW reference signal, the ports component 940 may be configured as or otherwise support a means for communicating a second chirp of the FMCW reference signal using a second port of the set of multiple ports based on the one or more FMCW waveform parameters, where the second chirp at least partially overlaps in time with the first chirp.

In some examples, to support communicating the FMCW reference signal, the FMCW reference signal component 935 may be configured as or otherwise support a means for transmitting an SRS, where the FMCW reference signal includes the SRS.

In some examples, the one or more FMCW waveform parameters include a chirp duration for the FMCW reference signal based on a number of ports of the set of multiple ports, a time-domain offset for respective ports of the set of multiple ports, a chirp BW for the FMCW reference signal, or any combination thereof.

In some examples, the time-domain offset is different for the respective ports of the set of multiple ports.

Figure 10:
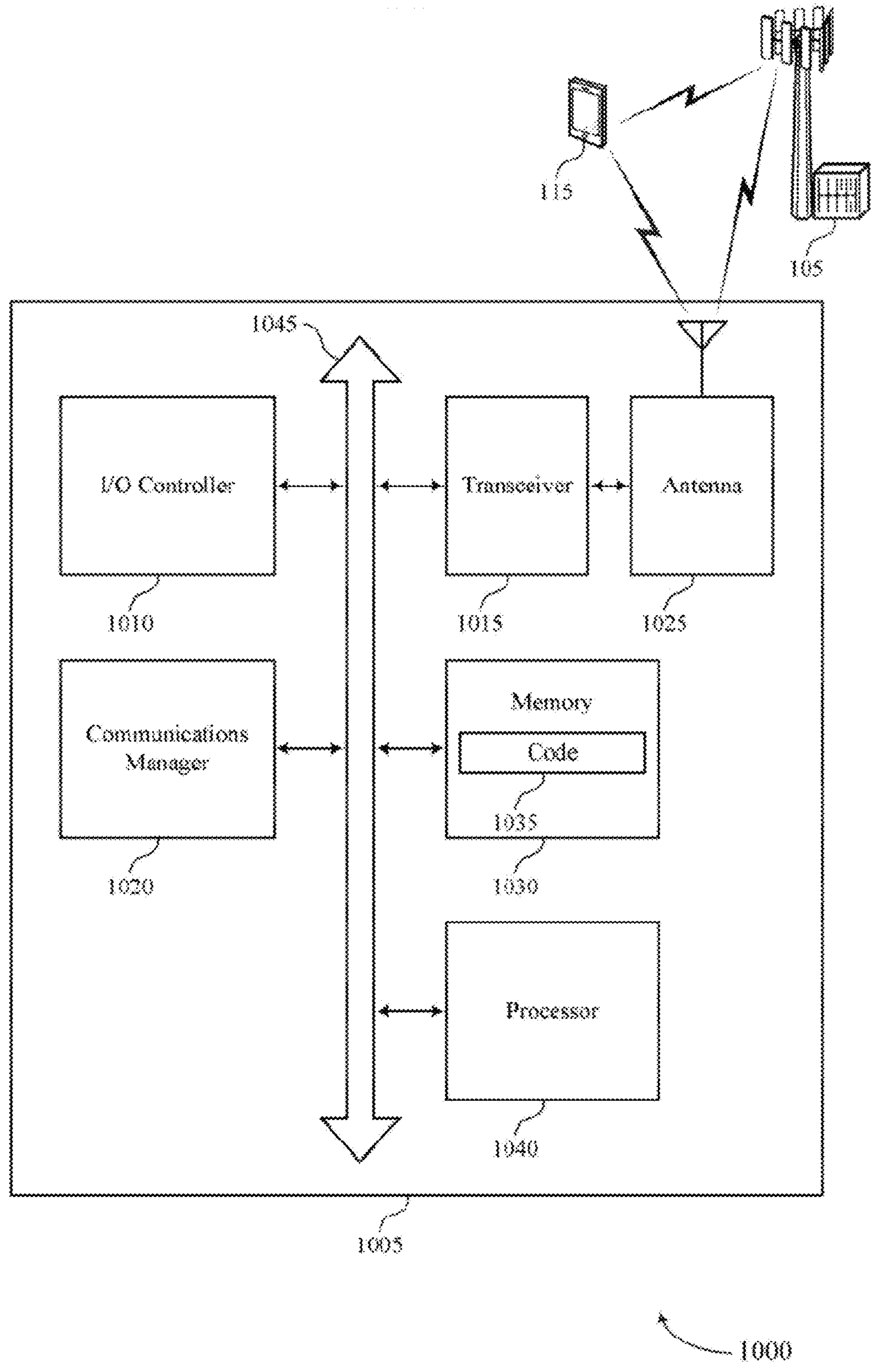
FIG. 10 illustrates a diagram of a system including a device that supports multi-port reference signal transmission for a FMCW waveform in accordance with one or more aspects of the present disclosure.

FIG. 10 illustrates a diagram of a system 1000 including a device 1005 that supports multi-port reference signal transmission for a FMCW waveform in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005.

In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting multi-port reference signal transmission for a FMCW waveform). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving an indication of one or more FMCW waveform parameters for an FMCW reference signal. The communications manager 1020 may be configured as or otherwise support a means for receiving a control message indicating one or more time-frequency resources for the FMCW reference signal and indicating a set of multiple ports for the FMCW reference signal. The communications manager 1020 may be configured as or otherwise support a means for communicating, using the one or more time-frequency resources, the FMCW reference signal via the set of multiple ports in accordance with the one or more FMCW waveform parameters.

By including or configuring the communications manager 1020 in accordance with examples as described herein, the device 1005 may support techniques for a network entity to transmit control signaling configuring a UE with FMCW waveform parameters for transmitting or receiving one or more FMCW reference signals via multiple ports, which may provide for improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of multi-port reference signal transmission for a FMCW waveform as described herein, or the processor 1040 and the memory 1030 may be otherwise configured to perform or support such operations.

Figure 11:
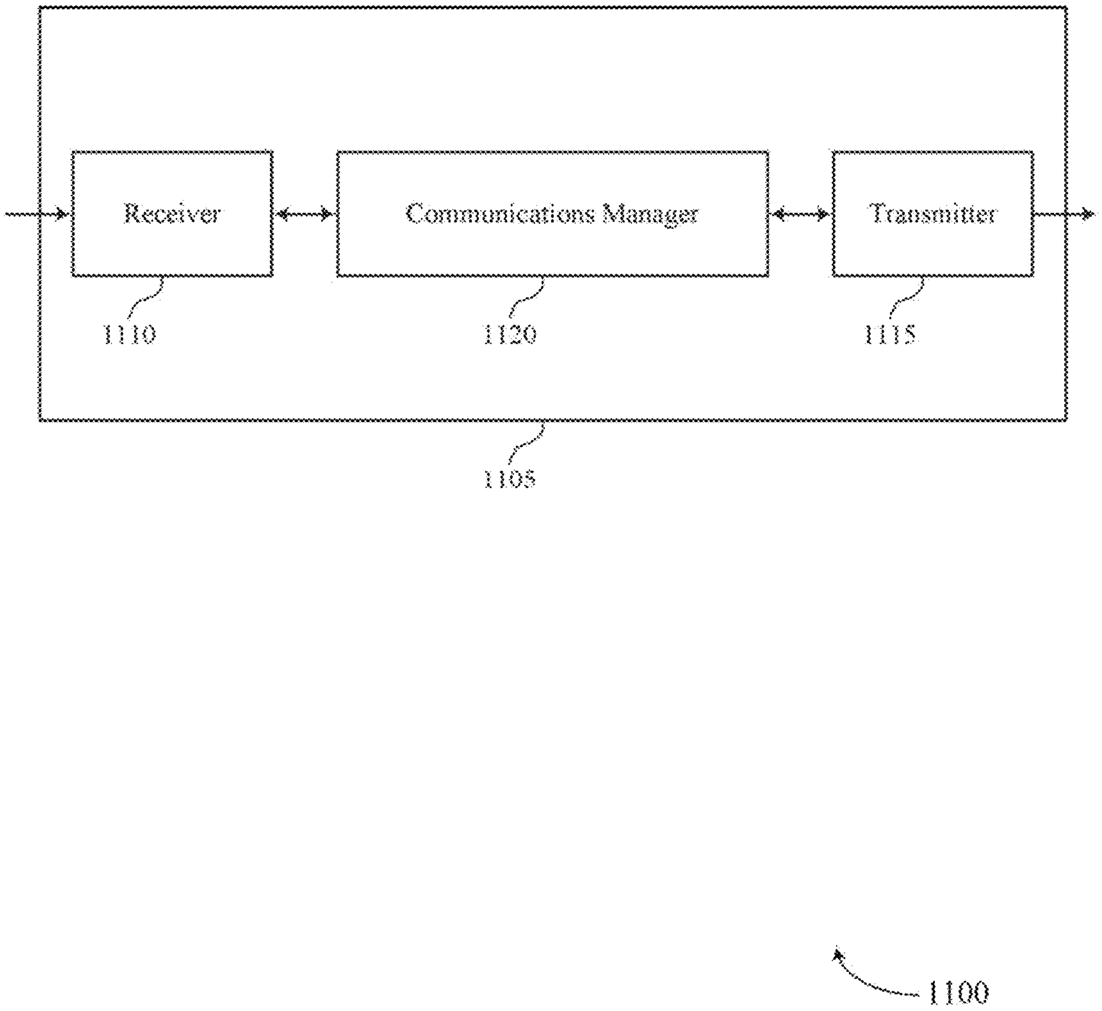
FIGS. 11 and 12 illustrate block diagrams of devices that support multi-port reference signal transmission for a FMCW waveform in accordance with one or more aspects of the present disclosure.

FIG. 11 illustrates a block diagram 1100 of a device 1105 that supports multi-port reference signal transmission for a FMCW waveform in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of multi-port reference signal transmission for a FMCW waveform as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. For example, the communications manager 1120 may be configured as or otherwise support a means for transmitting an indication of one or more FMCW waveform parameters for an FMCW reference signal. The communications manager 1120 may be configured as or otherwise support a means for transmitting a control message indicating one or more time-frequency resources for the FMCW reference signal and indicating a set of multiple ports for the FMCW reference signal. The communications manager 1120 may be configured as or otherwise support a means for communicating, using the one or more time-frequency resources, the FMCW reference signal via the set of multiple ports in accordance with the one or more FMCW waveform parameters.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for a network entity to transmit control signaling configuring a UE with FMCW waveform parameters for transmitting or receiving one or more FMCW reference signals via multiple ports, which may provide reduced processing, reduced power consumption, more efficient utilization of communication resources, and the like.

Figure 12:
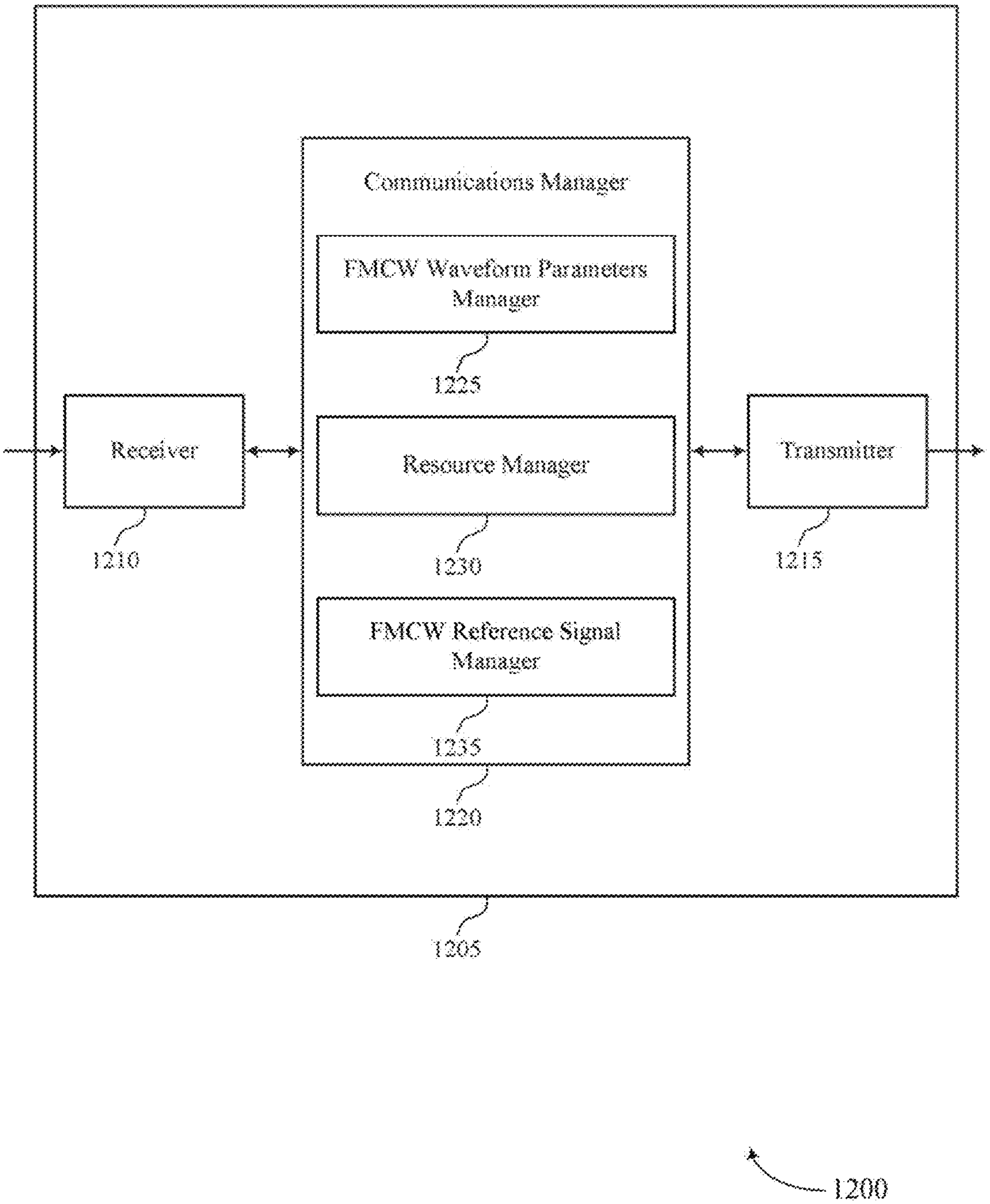

FIG. 12 illustrates a block diagram 1200 of a device 1205 that supports multi-port reference signal transmission for a FMCW waveform in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of multi-port reference signal transmission for a FMCW waveform as described herein. For example, the communications manager 1220 may include an FMCW waveform parameters manager 1225, a resource manager 1230, an FMCW reference signal manager 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The FMCW waveform parameters manager 1225 may be configured as or otherwise support a means for transmitting an indication of one or more FMCW waveform parameters for an FMCW reference signal. The resource manager 1230 may be configured as or otherwise support a means for transmitting a control message indicating one or more time-frequency resources for the FMCW reference signal and indicating a set of multiple ports for the FMCW reference signal. The FMCW reference signal manager 1235 may be configured as or otherwise support a means for communicating, using the one or more time-frequency resources, the FMCW reference signal via the set of multiple ports in accordance with the one or more FMCW waveform parameters.

Figure 13:
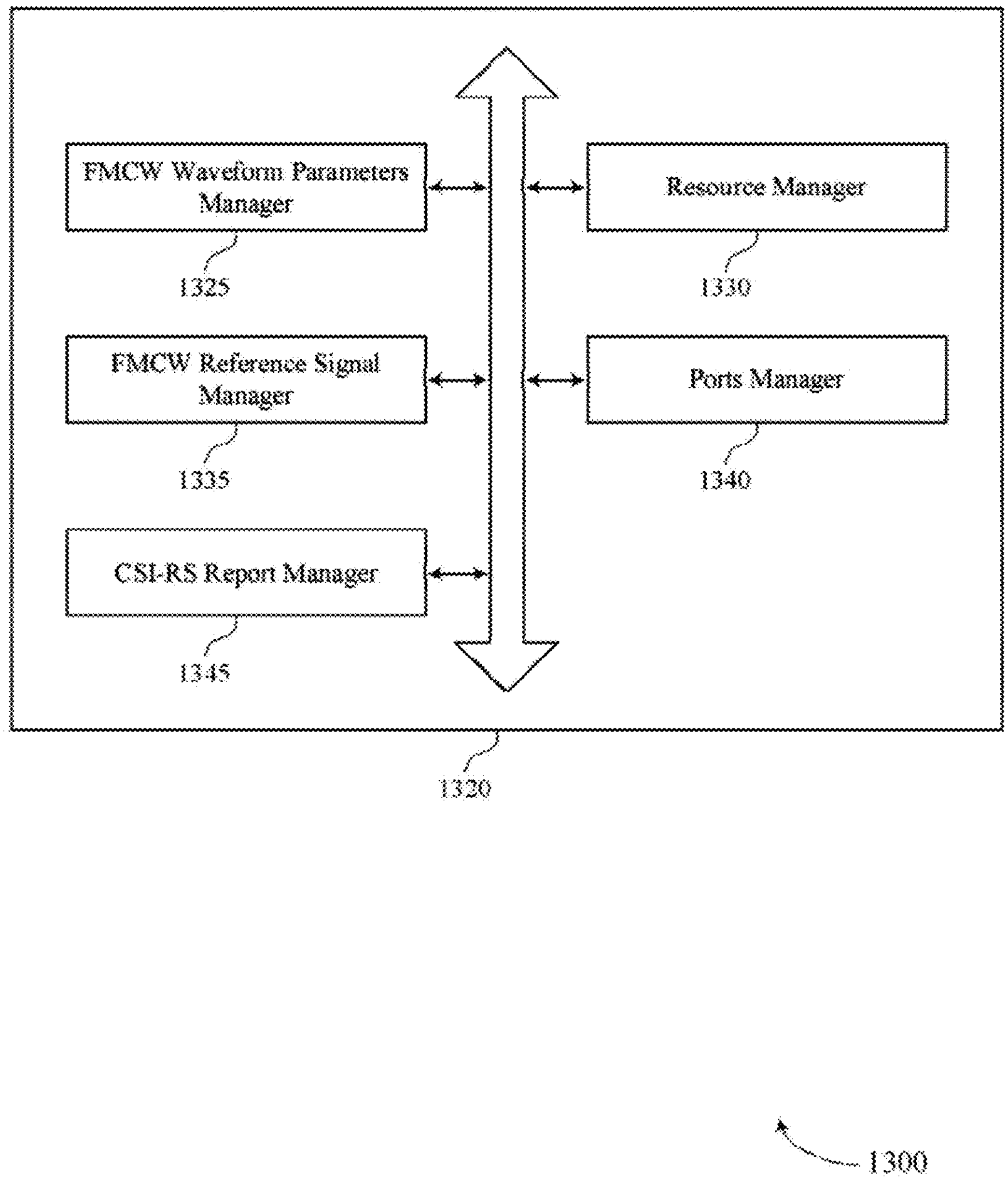
FIG. 13 illustrates a block diagram of a communications manager that supports multi-port reference signal transmission for a FMCW waveform in accordance with one or more aspects of the present disclosure.

FIG. 13 illustrates a block diagram 1300 of a communications manager 1320 that supports multi-port reference signal transmission for a FMCW waveform in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of multi-port reference signal transmission for a FMCW waveform as described herein. For example, the communications manager 1320 may include an FMCW waveform parameters manager 1325, a resource manager 1330, an FMCW reference signal manager 1335, a ports manager 1340, a CSI-RS report manager 1345, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communications at a network entity in accordance with examples as disclosed herein. The FMCW waveform parameters manager 1325 may be configured as or otherwise support a means for transmitting an indication of one or more FMCW waveform parameters for an FMCW reference signal. The resource manager 1330 may be configured as or otherwise support a means for transmitting a control message indicating one or more time-frequency resources for the FMCW reference signal and indicating a set of multiple ports for the FMCW reference signal. The FMCW reference signal manager 1335 may be configured as or otherwise support a means for communicating, using the one or more time-frequency resources, the FMCW reference signal via the set of multiple ports in accordance with the one or more FMCW waveform parameters.

In some examples, to support communicating the FMCW reference signal, the FMCW reference signal manager 1335 may be configured as or otherwise support a means for transmitting a CSI-RS via the set of multiple ports using the one or more time-frequency resources, where the FMCW reference signal includes the CSI-RS.

In some examples, the CSI-RS report manager 1345 may be configured as or otherwise support a means for receiving a report including one or more measurements associated with the CSI-RS, the one or more measurements corresponding to respective ports of the set of multiple ports.

In some examples, to support communicating the FMCW reference signal, the ports manager 1340 may be configured as or otherwise support a means for communicating a first chirp of the FMCW reference signal using a first port of the set of multiple ports based on the one or more FMCW waveform parameters. In some examples, to support communicating the FMCW reference signal, the ports manager 1340 may be configured as or otherwise support a means for communicating a second chirp of the FMCW reference signal using a second port of the set of multiple ports based on the one or more FMCW waveform parameters, where the second chirp is non-overlapping in time with the first chirp.

In some examples, to support communicating the FMCW reference signal, the ports manager 1340 may be configured as or otherwise support a means for communicating a first chirp of the FMCW reference signal using a first port of the set of multiple ports based on the one or more FMCW waveform parameters. In some examples, to support communicating the FMCW reference signal, the ports manager 1340 may be configured as or otherwise support a means for communicating a second chirp of the FMCW reference signal using a second port of the set of multiple ports based on the one or more FMCW waveform parameters, where the second chirp at least partially overlaps in time with the first chirp.

In some examples, to support communicating the FMCW reference signal, the FMCW reference signal manager 1335 may be configured as or otherwise support a means for receiving an SRS, where the FMCW reference signal includes the SRS.

In some examples, the one or more FMCW waveform parameters include a chirp duration for the FMCW reference signal based on a number of ports of the set of multiple ports, a time-domain offset for respective ports of the set of multiple ports, a chirp BW for the FMCW reference signal, or any combination thereof.

In some examples, the time-domain offset is different for the respective ports of the set of multiple ports.

Figure 14:
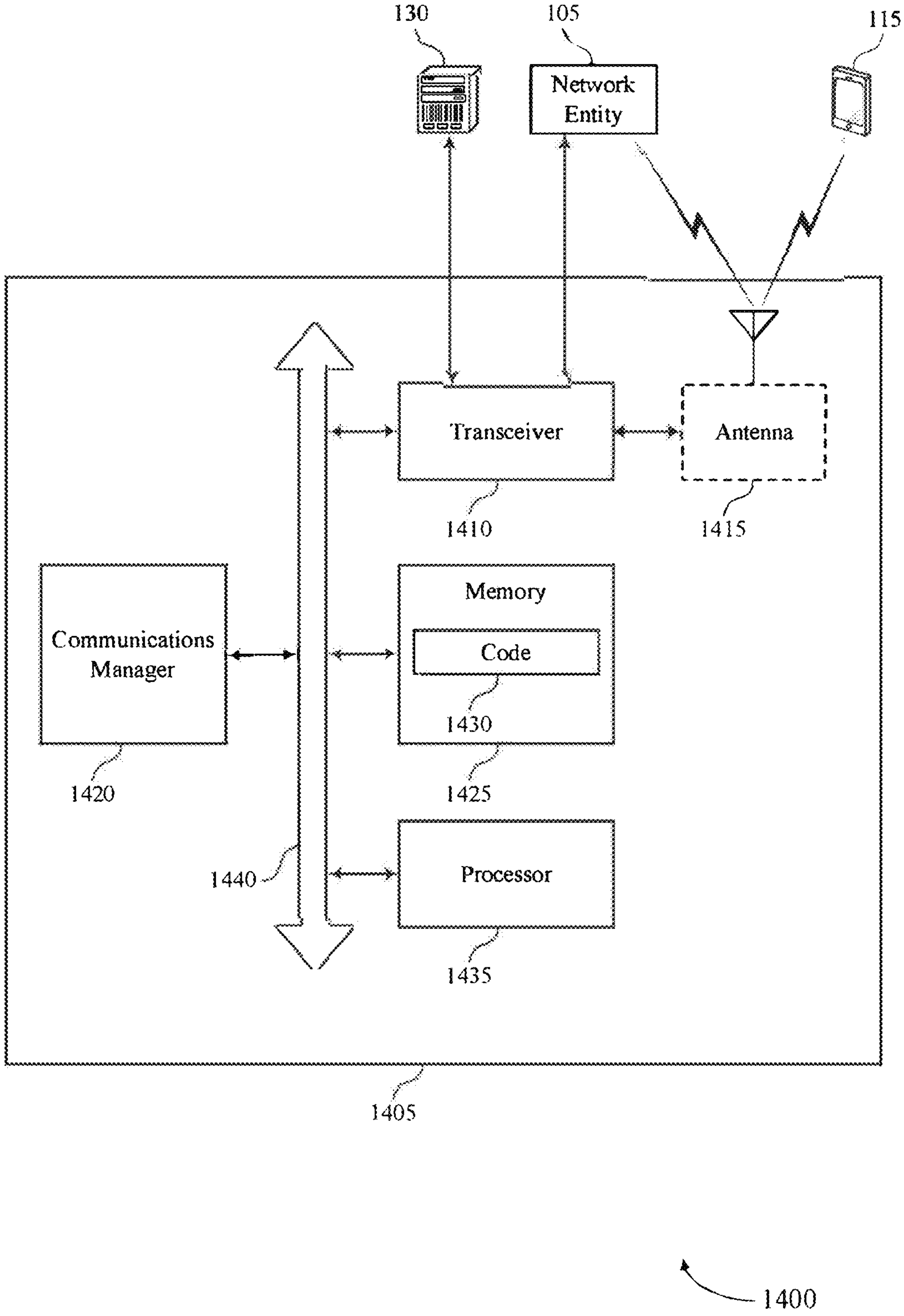
FIG. 14 illustrates a diagram of a system including a device that supports multi-port reference signal transmission for a FMCW waveform in accordance with one or more aspects of the present disclosure.

FIG. 14 illustrates a diagram of a system 1400 including a device 1405 that supports multi-port reference signal transmission for a FMCW waveform in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting multi-port reference signal transmission for a FMCW waveform). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system. A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communications at a network entity in accordance with examples as disclosed herein. For example, the communications manager 1420 may be configured as or otherwise support a means for transmitting an indication of one or more FMCW waveform parameters for an FMCW reference signal. The communications manager 1420 may be configured as or otherwise support a means for transmitting a control message indicating one or more time-frequency resources for the FMCW reference signal and indicating a set of multiple ports for the FMCW reference signal. The communications manager 1420 may be configured as or otherwise support a means for communicating, using the one or more time-frequency resources, the FMCW reference signal via the set of multiple ports in accordance with the one or more FMCW waveform parameters.

By including or configuring the communications manager 1420 in accordance with examples as described herein, the device 1405 may support techniques for a network entity to transmit control signaling configuring a UE with FMCW waveform parameters for transmitting or receiving one or more FMCW reference signals via multiple ports, which may provide for improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of multi-port reference signal transmission for a FMCW waveform as described herein, or the processor 1435 and the memory 1425 may be otherwise configured to perform or support such operations.

Figure 15:
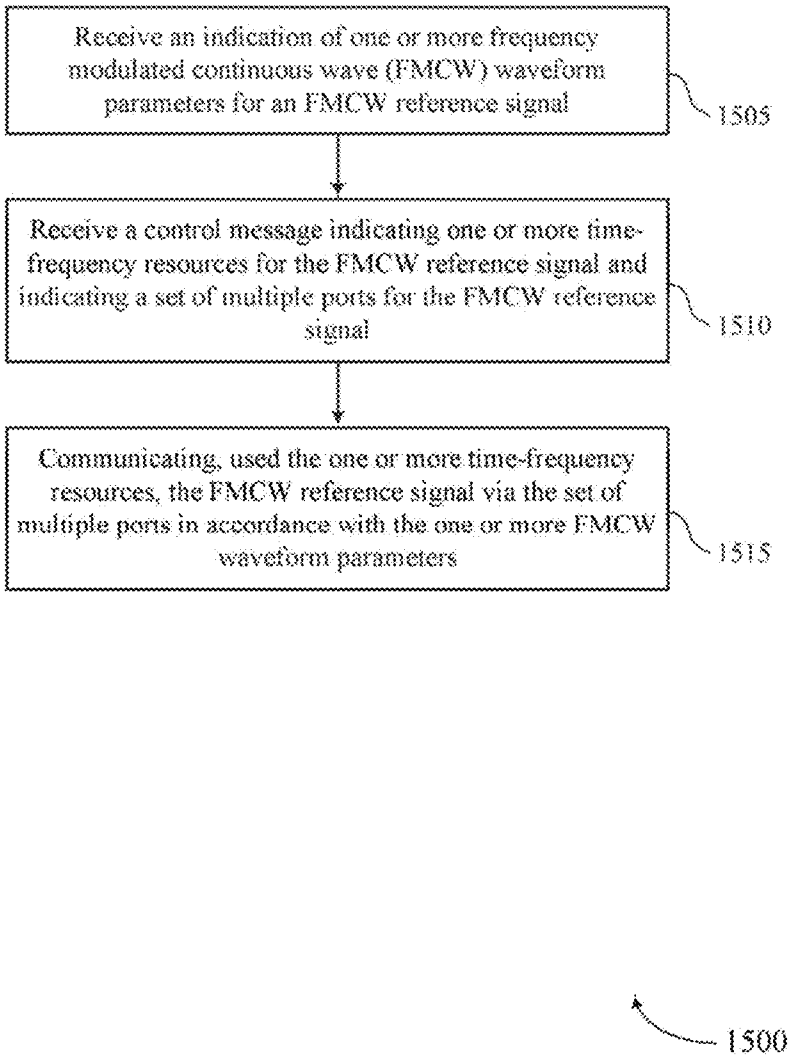
FIGS. 15 through 20 illustrate flowcharts showing methods that support multi-port reference signal transmission for a FMCW waveform in accordance with one or more aspects of the present disclosure.

FIG. 15 illustrates a flowchart showing a method 1500 that supports multi-port reference signal transmission for a FMCW waveform in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving an indication of one or more FMCW waveform parameters for an FMCW reference signal. The operations of 1505 may be performed in accordance with examples as disclosed herein. In some examples, aspects of the operations of 1505 may be performed by an FMCW waveform parameters component 925 as described with reference to FIG. 9.

At 1510, the method may include receiving a control message indicating one or more time-frequency resources for the FMCW reference signal and indicating a set of multiple ports for the FMCW reference signal. The operations of 1510 may be performed in accordance with examples as disclosed herein. In some examples, aspects of the operations of 1510 may be performed by a resources component 930 as described with reference to FIG. 9.

At 1515, the method may include communicating, using the one or more time-frequency resources, the FMCW reference signal via the set of multiple ports in accordance with the one or more FMCW waveform parameters. The operations of 1515 may be performed in accordance with examples as disclosed herein. In some examples, aspects of the operations of 1515 may be performed by an FMCW reference signal component 935 as described with reference to FIG. 9.

Figure 16:
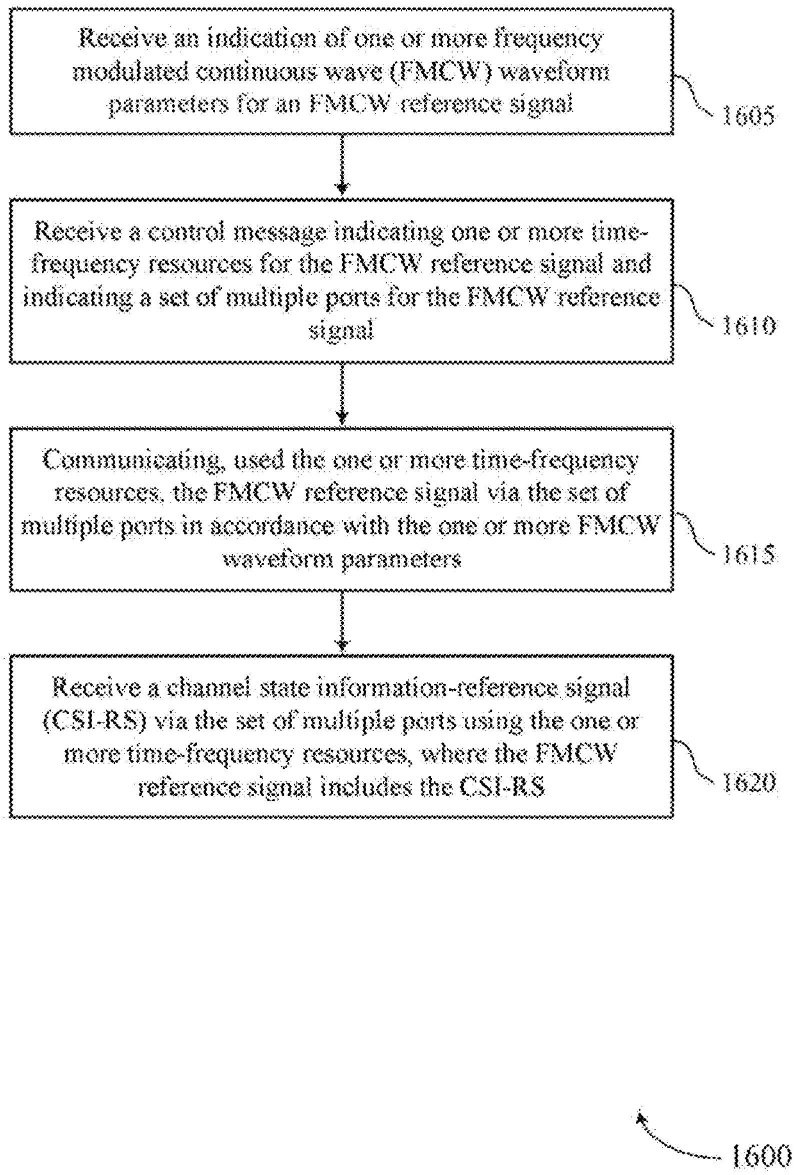

FIG. 16 illustrates a flowchart showing a method 1600 that supports multi-port reference signal transmission for a FMCW waveform in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving an indication of one or more FMCW waveform parameters for an FMCW reference signal. The operations of 1605 may be performed in accordance with examples as disclosed herein. In some examples, aspects of the operations of 1605 may be performed by an FMCW waveform parameters component 925 as described with reference to FIG. 9.

At 1610, the method may include receiving a control message indicating one or more time-frequency resources for the FMCW reference signal and indicating a set of multiple ports for the FMCW reference signal. The operations of 1610 may be performed in accordance with examples as disclosed herein. In some examples, aspects of the operations of 1610 may be performed by a resources component 930 as described with reference to FIG. 9.

At 1615, the method may include communicating, using the one or more time-frequency resources, the FMCW reference signal via the set of multiple ports in accordance with the one or more FMCW waveform parameters. The operations of 1615 may be performed in accordance with examples as disclosed herein. In some examples, aspects of the operations of 1615 may be performed by an FMCW reference signal component 935 as described with reference to FIG. 9.

At 1620, the method may include receiving a CSI-RS via the set of multiple ports using the one or more time-frequency resources, where the FMCW reference signal includes the CSI-RS. The operations of 1620 may be performed in accordance with examples as disclosed herein. In some examples, aspects of the operations of 1620 may be performed by an FMCW reference signal component 935 as described with reference to FIG. 9.

Figure 17:
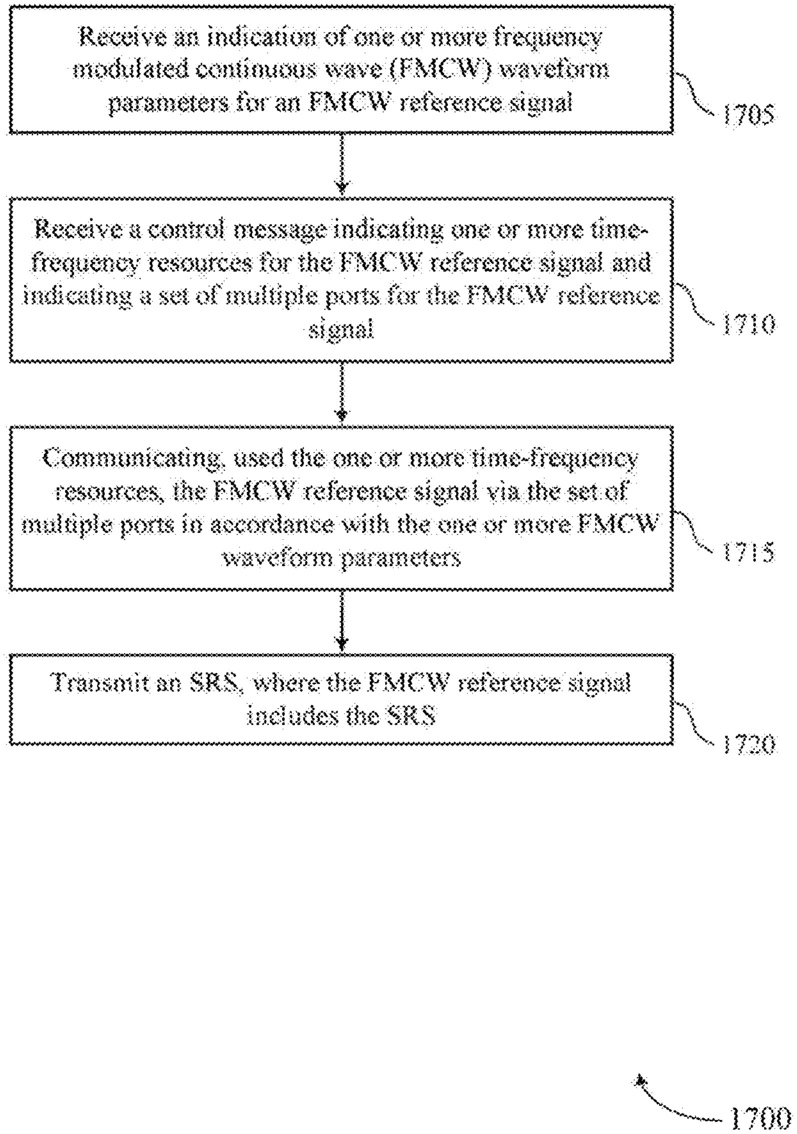

FIG. 17 illustrates a flowchart showing a method 1700 that supports multi-port reference signal transmission for a FMCW waveform in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving an indication of one or more FMCW waveform parameters for an FMCW reference signal. The operations of 1705 may be performed in accordance with examples as disclosed herein. In some examples, aspects of the operations of 1705 may be performed by an FMCW waveform parameters component 925 as described with reference to FIG. 9.

At 1710, the method may include receiving a control message indicating one or more time-frequency resources for the FMCW reference signal and indicating a set of multiple ports for the FMCW reference signal. The operations of 1710 may be performed in accordance with examples as disclosed herein. In some examples, aspects of the operations of 1710 may be performed by a resources component 930 as described with reference to FIG. 9.

At 1715, the method may include communicating, using the one or more time-frequency resources, the FMCW reference signal via the set of multiple ports in accordance with the one or more FMCW waveform parameters. The operations of 1715 may be performed in accordance with examples as disclosed herein. In some examples, aspects of the operations of 1715 may be performed by an FMCW reference signal component 935 as described with reference to FIG. 9.

At 1720, the method may include transmitting an SRS, where the FMCW reference signal includes the SRS. The operations of 1720 may be performed in accordance with examples as disclosed herein. In some examples, aspects of the operations of 1720 may be performed by an FMCW reference signal component 935 as described with reference to FIG. 9.

Figure 18:
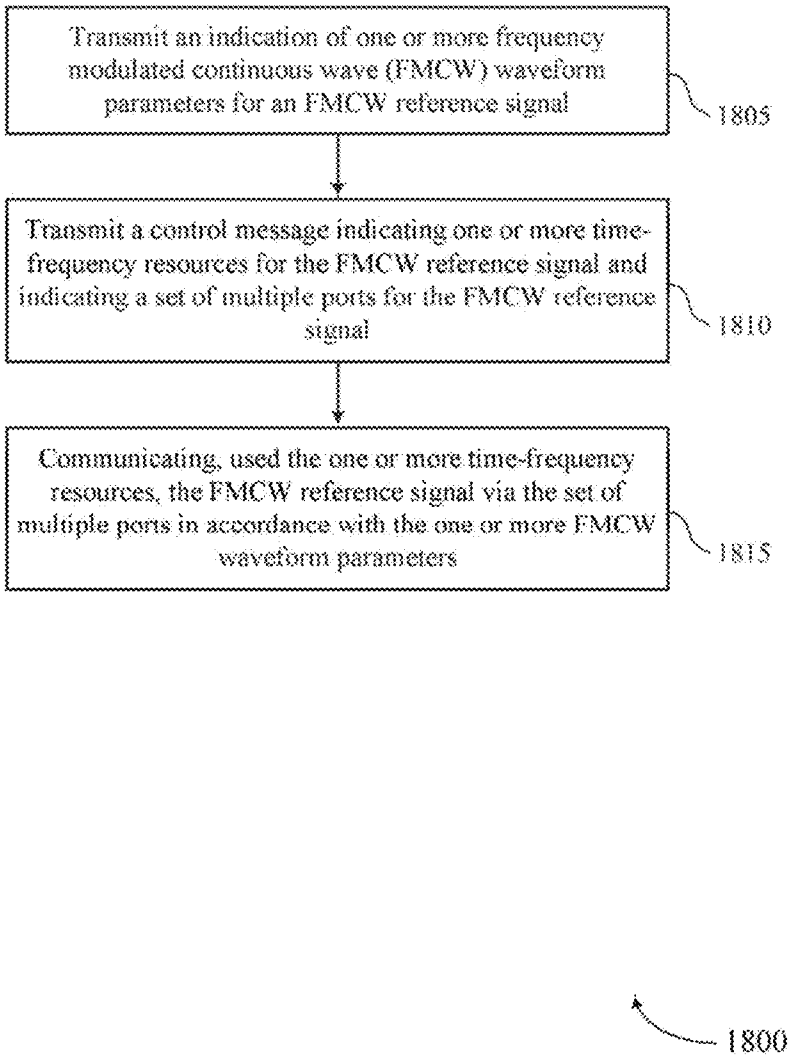

FIG. 18 illustrates a flowchart showing a method 1800 that supports multi-port reference signal transmission for a FMCW waveform in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting an indication of one or more FMCW waveform parameters for an FMCW reference signal. The operations of 1805 may be performed in accordance with examples as disclosed herein. In some examples, aspects of the operations of 1805 may be performed by an FMCW waveform parameters manager 1325 as described with reference to FIG. 13.

At 1810, the method may include transmitting a control message indicating one or more time-frequency resources for the FMCW reference signal and indicating a set of multiple ports for the FMCW reference signal. The operations of 1810 may be performed in accordance with examples as disclosed herein. In some examples, aspects of the operations of 1810 may be performed by a resource manager 1330 as described with reference to FIG. 13.

At 1815, the method may include communicating, using the one or more time-frequency resources, the FMCW reference signal via the set of multiple ports in accordance with the one or more FMCW waveform parameters. The operations of 1815 may be performed in accordance with examples as disclosed herein. In some examples, aspects of the operations of 1815 may be performed by an FMCW reference signal manager 1335 as described with reference to FIG. 13.

Figure 19:
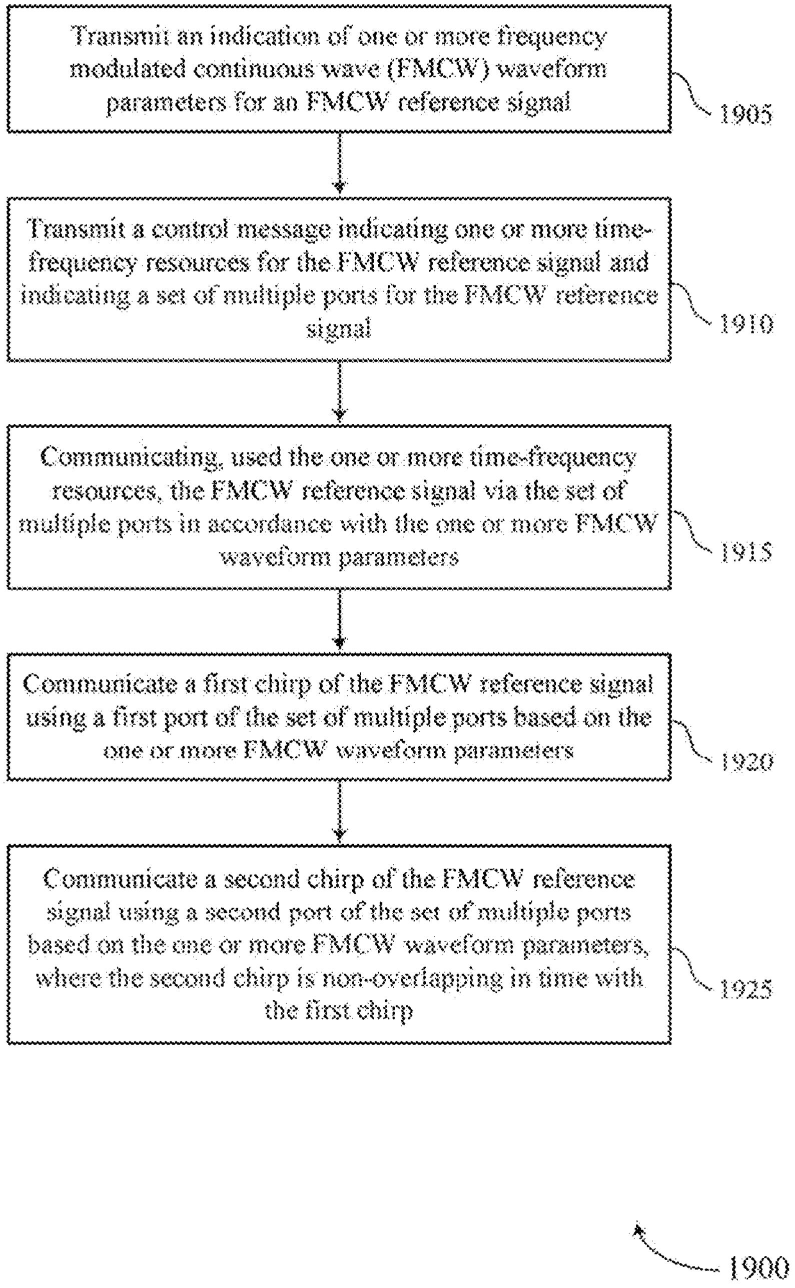

FIG. 19 illustrates a flowchart showing a method 1900 that supports multi-port reference signal transmission for a FMCW waveform in accordance with one or more aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1905, the method may include transmitting an indication of one or more FMCW waveform parameters for an FMCW reference signal. The operations of 1905 may be performed in accordance with examples as disclosed herein. In some examples, aspects of the operations of 1905 may be performed by an FMCW waveform parameters manager 1325 as described with reference to FIG. 13.

At 1910, the method may include transmitting a control message indicating one or more time-frequency resources for the FMCW reference signal and indicating a set of multiple ports for the FMCW reference signal. The operations of 1910 may be performed in accordance with examples as disclosed herein. In some examples, aspects of the operations of 1910 may be performed by a resource manager 1330 as described with reference to FIG. 13.

At 1915, the method may include communicating, using the one or more time-frequency resources, the FMCW reference signal via the set of multiple ports in accordance with the one or more FMCW waveform parameters. The operations of 1915 may be performed in accordance with examples as disclosed herein. In some examples, aspects of the operations of 1915 may be performed by an FMCW reference signal manager 1335 as described with reference to FIG. 13.

At 1920, the method may include communicating a first chirp of the FMCW reference signal using a first port of the set of multiple ports based on the one or more FMCW waveform parameters. The operations of 1920 may be performed in accordance with examples as disclosed herein. In some examples, aspects of the operations of 1920 may be performed by a ports manager 1340 as described with reference to FIG. 13.

At 1925, the method may include communicating a second chirp of the FMCW reference signal using a second port of the set of multiple ports based on the one or more FMCW waveform parameters, where the second chirp is non-overlapping in time with the first chirp. The operations of 1925 may be performed in accordance with examples as disclosed herein. In some examples, aspects of the operations of 1925 may be performed by a ports manager 1340 as described with reference to FIG. 13.

Figure 20:
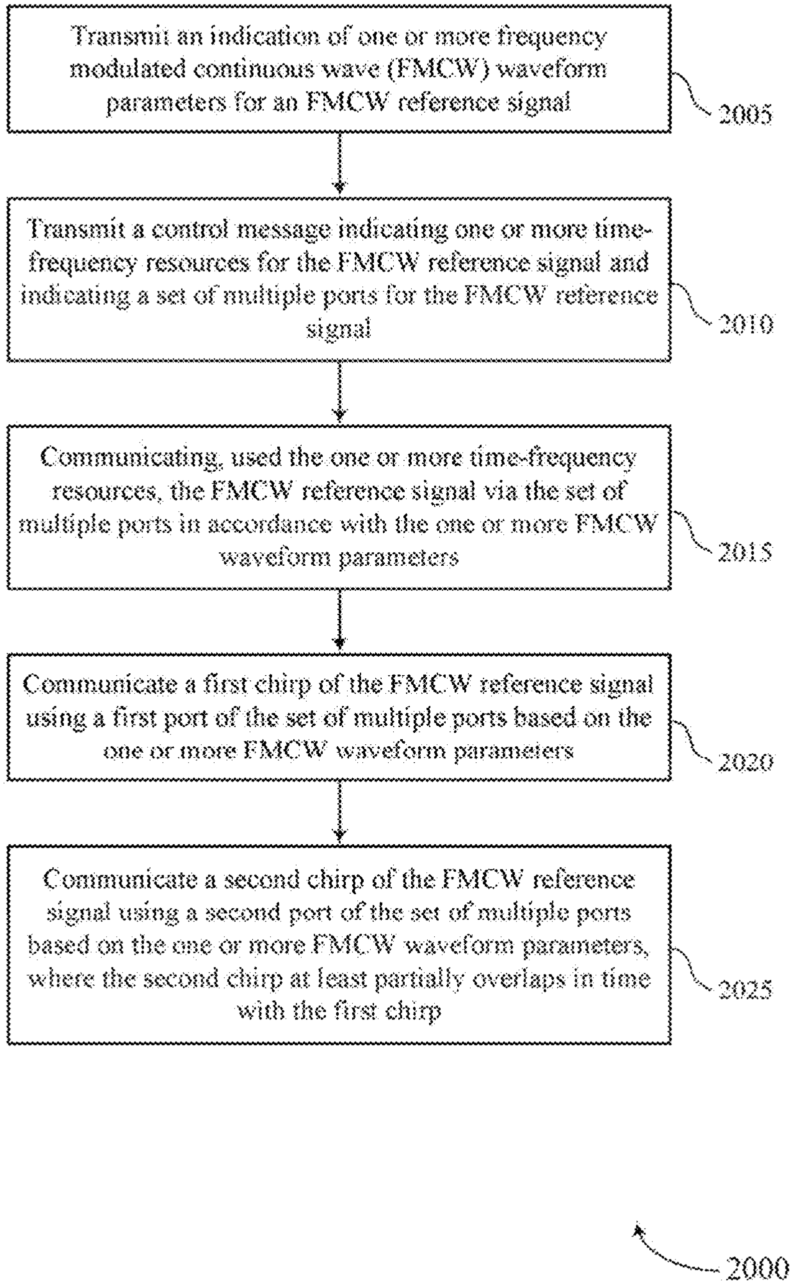

FIG. 20 illustrates a flowchart showing a method 2000 that supports multi-port reference signal transmission for a FMCW waveform in accordance with one or more aspects of the present disclosure. The operations of the method 2000 may be implemented by a network entity or its components as described herein. For example, the operations of the method 2000 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2005, the method may include transmitting an indication of one or more FMCW waveform parameters for an FMCW reference signal. The operations of 2005 may be performed in accordance with examples as disclosed herein. In some examples, aspects of the operations of 2005 may be performed by an FMCW waveform parameters manager 1325 as described with reference to FIG. 13.

At 2010, the method may include transmitting a control message indicating one or more time-frequency resources for the FMCW reference signal and indicating a set of multiple ports for the FMCW reference signal. The operations of 2010 may be performed in accordance with examples as disclosed herein. In some examples, aspects of the operations of 2010 may be performed by a resource manager 1330 as described with reference to FIG. 13.

At 2015, the method may include communicating, using the one or more time-frequency resources, the FMCW reference signal via the set of multiple ports in accordance with the one or more FMCW waveform parameters. The operations of 2015 may be performed in accordance with examples as disclosed herein. In some examples, aspects of the operations of 2015 may be performed by an FMCW reference signal manager 1335 as described with reference to FIG. 13.

At 2020, the method may include communicating a first chirp of the FMCW reference signal using a first port of the set of multiple ports based on the one or more FMCW waveform parameters. The operations of 2020 may be performed in accordance with examples as disclosed herein. In some examples, aspects of the operations of 2020 may be performed by a ports manager 1340 as described with reference to FIG. 13.

At 2025, the method may include communicating a second chirp of the FMCW reference signal using a second port of the set of multiple ports based on the one or more FMCW waveform parameters, where the second chirp at least partially overlaps in time with the first chirp. The operations of 2025 may be performed in accordance with examples as disclosed herein. In some examples, aspects of the operations of 2025 may be performed by a ports manager 1340 as described with reference to FIG. 13.

The following provides an overview of aspects of the present disclosure:

Aspect 1: A method for wireless communications at a UE, comprising: receiving an indication of one or more frequency modulated continuous wave (FMCW) waveform parameters for an FMCW reference signal; receiving a control message indicating one or more time-frequency resources for the FMCW reference signal and indicating a plurality of ports for the FMCW reference signal; and communicating, using the one or more time-frequency resources, the FMCW reference signal via the plurality of ports in accordance with the one or more FMCW waveform parameters.

Aspect 2: The method of aspect 1, wherein communicating the FMCW reference signal comprises: receiving a channel state information-reference signal (CSI-RS) via the plurality of ports using the one or more time-frequency resources, wherein the FMCW reference signal comprises the CSI-RS.

Aspect 3: The method of aspect 2, further comprising: performing a frequency shifting operation and applying a low pass filter to the CSI-RS to separate each port of the plurality of ports; measuring the CSI-RS of respective ports of the plurality of ports to obtain one or more measurements associated with the CSI-RS; and transmitting a report comprising the one or more measurements associated with the CSI-RS.

Aspect 4: The method of any of aspects 1 through 3, wherein communicating the FMCW reference signal comprises: communicating a first chirp of the FMCW reference signal using a first port of the plurality of ports based at least in part on the one or more FMCW waveform parameters; and communicating a second chirp of the FMCW reference signal using a second port of the plurality of ports based at least in part on the one or more FMCW waveform parameters, wherein the second chirp is non-overlapping in time with the first chirp.

Aspect 5: The method of any of aspects 1 through 3, wherein communicating the FMCW reference signal comprises: communicating a first chirp of the FMCW reference signal using a first port of the plurality of ports based at least in part on the one or more FMCW waveform parameters; and communicating a second chirp of the FMCW reference signal using a second port of the plurality of ports based at least in part on the one or more FMCW waveform parameters, wherein the second chirp at least partially overlaps in time with the first chirp.

Aspect 6: The method of any of aspects 1 through 5, wherein communicating the FMCW reference signal comprises: transmitting an SRS, wherein the FMCW reference signal comprises the SRS.

Aspect 7: The method of any of aspects 1 through 6, wherein the one or more FMCW waveform parameters comprise a chirp duration for the FMCW reference signal based at least in part on a number of ports of the plurality of ports, a time-domain offset for respective ports of the plurality of ports, a chirp bandwidth for the FMCW reference signal, or any combination thereof.

Aspect 8: The method of aspect 7, wherein the time-domain offset is different for the respective ports of the plurality of ports.

Aspect 9: A method for wireless communications at a network entity, comprising: transmitting an indication of one or more frequency modulated continuous wave (FMCW) waveform parameters for an FMCW reference signal; transmitting a control message indicating one or more time-frequency resources for the FMCW reference signal and indicating a plurality of ports for the FMCW reference signal; and communicating, using the one or more time-frequency resources, the FMCW reference signal via the plurality of ports in accordance with the one or more FMCW waveform parameters.

Aspect 10: The method of aspect 9, wherein communicating the FMCW reference signal comprises: transmitting a channel state information-reference signal (CSI-RS) via the plurality of ports using the one or more time-frequency resources, wherein the FMCW reference signal comprises the CSI-RS.

Aspect 11: The method of aspect 10, further comprising: receiving a report comprising one or more measurements associated with the CSI-RS, the one or more measurements corresponding to respective ports of the plurality of ports.

Aspect 12: The method of any of aspects 9 through 11, wherein communicating the FMCW reference signal comprises: communicating a first chirp of the FMCW reference signal using a first port of the plurality of ports based at least in part on the one or more FMCW waveform parameters; and communicating a second chirp of the FMCW reference signal using a second port of the plurality of ports based at least in part on the one or more FMCW waveform parameters, wherein the second chirp is non-overlapping in time with the first chirp.

Aspect 13: The method of any of aspects 9 through 11, wherein communicating the FMCW reference signal comprises: communicating a first chirp of the FMCW reference signal using a first port of the plurality of ports based at least in part on the one or more FMCW waveform parameters; and communicating a second chirp of the FMCW reference signal using a second port of the plurality of ports based at least in part on the one or more FMCW waveform parameters, wherein the second chirp at least partially overlaps in time with the first chirp.

Aspect 14: The method of any of aspects 9 through 13, wherein communicating the FMCW reference signal comprises: receiving an SRS, wherein the FMCW reference signal comprises the SRS.

Aspect 15: The method of any of aspects 9 through 14, wherein the one or more FMCW waveform parameters comprise a chirp duration for the FMCW reference signal based at least in part on a number of ports of the plurality of ports, a time-domain offset for respective ports of the plurality of ports, a chirp bandwidth for the FMCW reference signal, or any combination thereof.

Aspect 16: The method of aspect 15, wherein the time-domain offset is different for the respective ports of the plurality of ports.

Aspect 17: An apparatus for wireless communications at a UE, comprising a processor; memory coupled with the processor; and instructions stored in the memory and executable by the processor to cause the apparatus to perform a method of any of aspects 1 through 8.

Aspect 18: An apparatus for wireless communications at a UE, comprising at least one means for performing a method of any of aspects 1 through 8.

Aspect 19: A non-transitory computer-readable medium storing code for wireless communications at a UE, the code comprising instructions executable by a processor to perform a method of any of aspects 1 through 8.

Aspect 20: An apparatus for wireless communications at a network entity, comprising a processor; memory coupled with the processor; and instructions stored in the memory and executable by the processor to cause the apparatus to perform a method of any of aspects 9 through 16.

Aspect 21: An apparatus for wireless communications at a network entity, comprising at least one means for performing a method of any of aspects 9 through 16.

Aspect 22: A non-transitory computer-readable medium storing code for wireless communications at a network entity, the code comprising instructions executable by a processor to perform a method of any of aspects 9 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
- a processor;
- memory coupled with the processor; and
- instructions stored in the memory and executable by the processor to cause the apparatus to:
- receive an indication of one or more frequency modulated continuous wave (FMCW) waveform parameters for an FMCW reference signal;
- receive a control message indicating one or more time-frequency resources for the FMCW reference signal and indicating a plurality of ports for the FMCW reference signal; and communicating, using the one or more time-frequency resources, the FMCW reference signal via the plurality of ports in accordance with the one or more FMCW waveform parameters.

2. The apparatus of claim 1, wherein the instructions to communicate the FMCW reference signal are executable by the processor to cause the apparatus to:
- receive a channel state information-reference signal (CSI-RS) via the plurality of ports using the one or more time-frequency resources, wherein the FMCW reference signal comprises the CSI-RS.

3. The apparatus of claim 2, wherein the instructions are further executable by the processor to cause the apparatus to:
- perform a frequency shifting operation and applying a low pass filter to the CSI-RS to separate each port of the plurality of ports;
- measure the CSI-RS of respective ports of the plurality of ports to obtain one or more measurements associated with the CSI-RS; and
- transmit a report comprising the one or more measurements associated with the CSI-RS.

4. The apparatus of claim 1, wherein the instructions to communicate the FMCW reference signal are executable by the processor to cause the apparatus to:
- communicate a first chirp of the FMCW reference signal using a first port of the plurality of ports based at least in part on the one or more FMCW waveform parameters, and
- communicate a second chirp of the FMCW reference signal using a second port of the plurality of ports based at least in part on the one or more FMCW waveform parameters, wherein the second chirp is non-overlapping in time with the first chirp.

5. The apparatus of claim 1, wherein the instructions to communicate the FMCW reference signal are executable by the processor to cause the apparatus to:

communicate a first chirp of the FMCW reference signal using a first port of the plurality of ports based at least in part on the one or more FMCW waveform parameters; and communicate a second chirp of the FMCW reference signal using a second port of the plurality of ports based at least in part on the one or more FMCW waveform parameters, wherein the second chirp at least partially overlaps in time with the first chirp.

6. The apparatus of claim 1, wherein the instructions to communicate the FMCW reference signal are executable by the processor to cause the apparatus to:

transmit a sounding reference signal (SRS), wherein the FMCW reference signal comprises the SRS.

7. The apparatus of claim 1, wherein the one or more FMCW waveform parameters comprise a chirp duration for the FMCW reference signal based at least in part on a number of ports of the plurality of ports, a time-domain offset for respective ports of the plurality of ports, a chirp bandwidth for the FMCW reference signal, or any combination thereof.

8. The apparatus of claim 7, wherein the time-domain offset is different for the respective ports of the plurality of ports.

9. An apparatus for wireless communications at a network entity, comprising:

a processor;

memory coupled with the processor; and instructions stored in the memory and executable by the processor to cause the apparatus to:

transmit an indication of one or more frequency modulated continuous wave (FMCW) waveform parameters for an FMCW reference signal;

transmit a control message indicating one or more time-frequency resources for the FMCW reference signal and indicating a plurality of ports for the FMCW reference signal; and communicating, using the one or more time-frequency resources, the FMCW reference signal via the plurality of ports in accordance with the one or more FMCW waveform parameters.

10. The apparatus of claim 9, wherein the instructions to communicate the FMCW reference signal are executable by the processor to cause the apparatus to:

transmit a channel state information-reference signal (CSI-RS) via the plurality of ports using the one or more time-frequency resources, wherein the FMCW reference signal comprises the CSI-RS.

11. The apparatus of claim 10, wherein the instructions are further executable by the processor to cause the apparatus to:

receive a report comprising one or more measurements associated with the CSI-RS, the one or more measurements corresponding to respective ports of the plurality of ports.

12. The apparatus of claim 9, wherein the instructions to communicate the FMCW reference signal are executable by the processor to cause the apparatus to:

communicate a first chirp of the FMCW reference signal using a first port of the plurality of ports based at least in part on the one or more FMCW waveform parameters; and communicate a second chirp of the FMCW reference signal using a second port of the plurality of ports based at least in part on the one or more FMCW waveform parameters, wherein the second chirp is non-overlapping in time with the first chirp.

13. The apparatus of claim 9, wherein the instructions to communicate the FMCW reference signal are executable by the processor to cause the apparatus to:

communicate a first chirp of the FMCW reference signal using a first port of the plurality of ports based at least in part on the one or more FMCW waveform parameters; and communicate a second chirp of the FMCW reference signal using a second port of the plurality of ports based at least in part on the one or more FMCW waveform parameters, wherein the second chirp at least partially overlaps in time with the first chirp.

14. The apparatus of claim 9, wherein the instructions to communicate the FMCW reference signal are executable by the processor to cause the apparatus to:

receive a sounding reference signal (SRS), wherein the FMCW reference signal comprises the SRS.

15. The apparatus of claim 9, wherein the one or more FMCW waveform parameters comprise a chirp duration for the FMCW reference signal based at least in part on a number of ports of the plurality of ports, a time-domain offset for respective ports of the plurality of ports, a chirp bandwidth for the FMCW reference signal, or any combination thereof.

16. The apparatus of claim 15, wherein the time-domain offset is different for the respective ports of the plurality of ports.

17. A method for wireless communications at a user equipment (UE), comprising:

receiving an indication of one or more frequency modulated continuous wave (FMCW) waveform parameters for an FMCW reference signal;

receiving a control message indicating one or more time-frequency resources for the FMCW reference signal and indicating a plurality of ports for the FMCW reference signal; and communicating, using the one or more time-frequency resources, the FMCW reference signal via the plurality of ports in accordance with the one or more FMCW waveform parameters.

18. A method for wireless communications at a network entity, comprising:

transmitting an indication of one or more frequency modulated continuous wave (FMCW) waveform parameters for an FMCW reference signal;

transmitting a control message indicating one or more time-frequency resources for the FMCW reference signal and indicating a plurality of ports for the FMCW reference signal; and communicating, using the one or more time-frequency resources, the FMCW reference signal via the plurality of ports in accordance with the one or more FMCW waveform parameters.

19. The method of claim 18, wherein communicating the FMCW reference signal comprises:

transmitting a channel state information-reference signal (CSI-RS) via the plurality of ports using the one or more time-frequency resources, wherein the FMCW reference signal comprises the CSI-RS.

20. The method of claim 19, further comprising:

receiving a report comprising one or more measurements associated with the CSI-RS, the one or more measurements corresponding to respective ports of the plurality of ports.

* * * * *